United States Patent [19]

Nakajima et al.

[11] Patent Number: 5,698,976
[45] Date of Patent: Dec. 16, 1997

[54] POINTING DEVICE HAVING COORDINATE INPUT WHICH GENERATES MAGNETIC FLUX

[75] Inventors: Takashi Nakajima; Shigemi Kurashima, both of Kawasaki, Japan

[73] Assignee: Fujitsu Limited, Kanagawa, Japan

[21] Appl. No.: 517,715

[22] Filed: Aug. 21, 1995

[30] Foreign Application Priority Data

Jan. 9, 1995 [JP] Japan ................................. 7-001399

[51] Int. Cl.⁶ .................. G06F 3/00; G01B 7/30; G01B 7/14; G08C 19/06
[52] U.S. Cl. ................ 324/207.23; 324/207.22; 341/15
[58] Field of Search ................ 324/207.23, 207.22, 324/207.2, 207.21, 207.16, 207.24; 178/18, 19, 20; 341/15

[56] References Cited

U.S. PATENT DOCUMENTS 5,072,179 12/1991 Miller et al. ................ 324/207.23

*Primary Examiner*—Walter E. Snow
*Attorney, Agent, or Firm*—Nikaido Marmelstein Murray & Oram LLP

[57] ABSTRACT

A pointing device includes a plate which is made of a magnetic material and having at least one surface with a regular change in first geometrical configuration along a direction y and a regular change in second geometrical configuration along a direction x which is perpendicular to the direction y, where the change in first geometrical configuration is different from the change in second geometrical configuration, and a coordinate input part slidably provided on the surface of the plate. The coordinate input part comprises a mechanism for generating one of a magnetic flux and magnetic field, and a mechanism for detecting a change in the magnetic flux or magnetic field fed back to the coordinate input part via the plate and generating signals indicating a moving direction and a moving quantity of the coordinate input part on the plate.

15 Claims, 48 Drawing Sheets

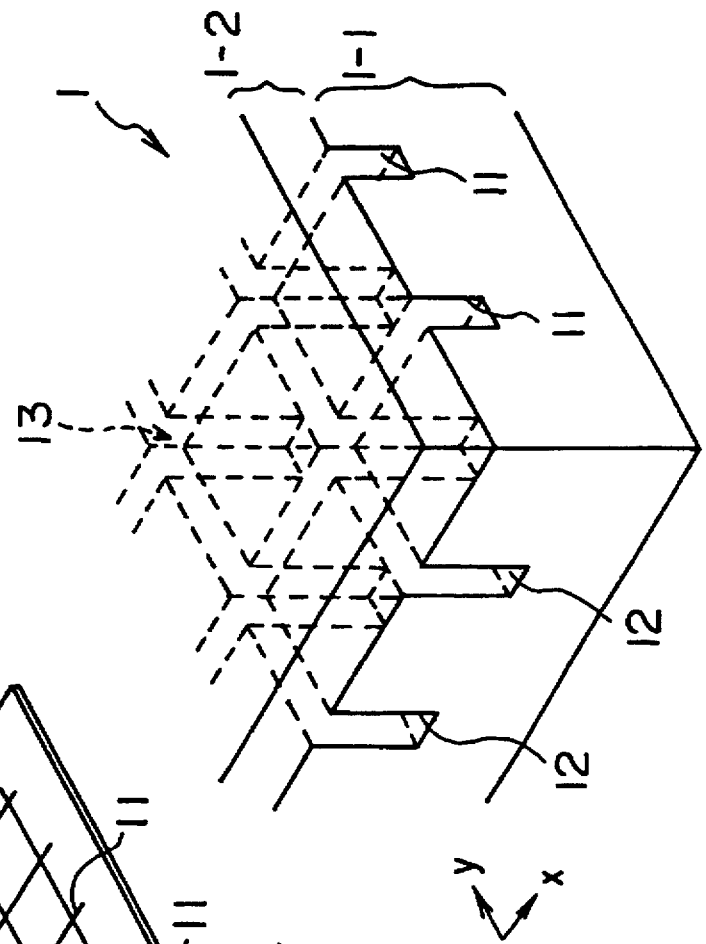
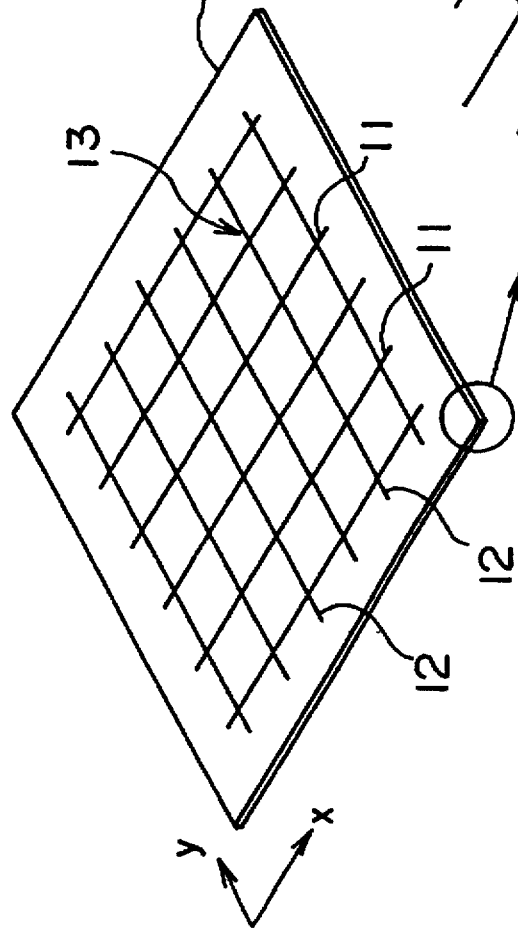

FIG. 53

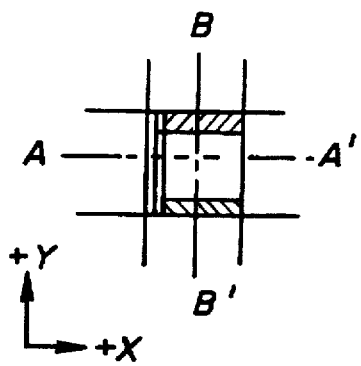

FIG. 54

| VOLTAGE CHANGE | MOVING DIRECTION | |
|---|---|---|
| | X-AXIS | Y-AXIS |
| $3/9V_x \rightarrow 2/9V_x$ | + | NO OUTPUT |
| $2/9V_x \rightarrow 3/9V_x$ | − | NO OUTPUT |
| $1/9V_x \rightarrow 2/9V_x \rightarrow 4/9V_x$ | NO OUTPUT | + |
| $4/9V_x \rightarrow 2/9V_x \rightarrow 1/9V_x$ | NO OUTPUT | − |
| $1/9V_x \rightarrow 2/9V_x \rightarrow 3/9V_x$ | − | + |
| $3/9V_x \rightarrow 2/9V_x \rightarrow 1/9V_x$ | + | − |
| $3/9V_x \rightarrow 2/9V_x \rightarrow 4/9V_x$ | + | + |
| $4/9V_x \rightarrow 2/9V_x \rightarrow 3/9V_x$ | − | − |

POINTING DEVICE HAVING COORDINATE INPUT WHICH GENERATES MAGNETIC FLUX

BACKGROUND OF THE INVENTION

The present invention generally relates to pointing devices, and more particularly to a pointing device which inputs coordinates to a terminal equipment or the like by moving a detector on a plate.

In terminal equipments including office automation (OA) equipments such as personal computers, various kinds of pointing devices are used to input coordinates. In such pointing devices, there is a demand to accurately input the coordinates by a simple operation.

The pointing devices typified by a mouse, may be roughly categorized into a mechanical type and an optical type. The mechanical pointing device has a structure for optically detecting a rotation of a ball provided within the mouse. On the other hand, the optical pointing device has a structure for optically detecting a number of marks traversed by an optical sensor within a detector as the detector moves on a plate having the marks.

FIG. 1 is a plan view showing a part of a conventional mouse. In FIG. 1, a ball 501 is rotatably supported by a pair of shafts 502x and 502y and a support member 503, and is rotatable in an arbitrary direction. When the ball 501 rotates, at least one of the shafts 502x and 502y rotates depending on the rotating direction of the ball 501, thereby rotating code wheels 504x and 504y respectively provided on the tip ends of the shafts 502x and 502y. For example, when the mouse moves in a direction x, the shaft 502x and the code wheel 504x rotate. On the other hand, when the mouse moves in a direction y, the shaft 502y and the code wheel 504y rotate. The rotation of the code wheel 504x is detected by a photocoupler made up of a light emitting diode (LED) 505x and a phototransistor 506x, while the rotation of the code wheel 504y is detected by a photocoupler made up of a LED 505y and a phototransistor 506y.

FIG. 2 is a circuit diagram showing a detection system for detecting a movement of the ball 501 in the direction x. In FIG. 2, one end of the LED 505x is grounded, and the other end of the LED 505x is connected to a power supply voltage Vcc via a voltage limiting resistor R1. The emitter of the phototransistor 506x is grounded, and the collector of the phototransistor 506x is connected to the power supply voltage Vcc via a level stabilizing resistor R2. A node connecting the collector of the phototransistor 506x and the resistor R2 is connected to a terminal 509 via a buffer 508. In addition, an output of the buffer 508 is connected to the power supply voltage Vcc via a pull-up resistor R3. A signal dependent on the moving quantity of the ball 501 is output from the terminal 509.

It is possible to detect whether the ball 501 moved in a positive or negative direction along the direction x, by providing a second photocoupler (not shown) made up of a LED and a phototransistor with respect to the code wheel 504x on the tip end of the shaft 502x, with a phase deviated from that of the LED 505x and the phototransistor 506x, and detecting the phase error between the outputs of the two photocouplers.

In addition, the detection system for detecting the movement of the ball 501 in the direction y may have a construction similar to that shown in FIG. 2, and illustration and description thereof will be omitted.

However, in the conventional mouse described above, the rotation of the ball 501 is detected mechanically, and fric-tional wear of the ball 501 and the shafts 502x and 502y is unavoidable. For this reason, the diameter of the ball 501 decreases as the total run distance of the ball 501 increases, as shown in FIG. 3. Consequently, there was a problem in that an accurate coordinate input cannot be made when the diameter of the ball 501 decreases below a threshold value, that is, a discrimination limit.

On the other hand, the mouse is moved on the desk or on a special sheet provided exclusively for the mouse. Hence, dust particles and the like on the desk top or the special sheet directly adhere on the ball 501 when the mouse is moved. For this reason, there was a problem in that the ball 501 and the related parts of the mouse must be cleaned periodically. If the ball 501 and the related parts of the mouse are not cleaned, the dust particles and the like will reach the photocouplers within the mouse and deteriorate the light emitting quantity or the light receiving quantity thereby causing the sensitivity of the photocouplers to deteriorate. In addition, when a current is applied to the photocouplers for a long period of time, the sensitivity of the photocoupler itself deteriorates with time (age). In other words, as shown in FIG. 4, the sensitivity of the photocoupler deteriorates as the total run distance increases due to the adhering dust particles and the like, and in addition, the sensitivity of the photocoupler itself also deteriorates with the change in the characteristic of the photocoupler with time (age). Therefore, there was a problem in that an accurate coordinate input cannot be made when the sensitivity of the photocoupler decreases below a threshold value, that is, a discrimination limit.

The periodic maintenance is essential to maintain the detection accuracy of the mechanical pointing device such as the mouse. In addition, even when the periodic maintenance is made, it was impossible to avoid the deterioration of the detection accuracy caused by the frictional wear of the mechanical parts and the change in the characteristic of the photocoupler itself with time (age).

On the other hand, the periodic maintenance is also essential to maintain the detection accuracy of the optical pointing device, and the optical sensor must be cleaned to remove the dust particles and the like. Further, it was impossible to avoid the deterioration of the detection accuracy caused by the change in the characteristic of the optical sensor itself with time (age).

SUMMARY OF THE INVENTION

Accordingly, it is a general object of the present invention to provide a novel and useful pointing device in which the problems described above are eliminated.

Another and more specific object of the present invention is to provide a pointing device comprising a plate made of a magnetic material and having at least one surface with a regular change in first geometrical configuration along a direction y, and a regular change in second geometrical configuration along a direction x which is perpendicular to the direction y, where the change in first geometrical configuration is different from the change in second geometrical configuration, and a coordinate input part slidably provided on the surface of the plate, where the coordinate input part comprises a mechanism which generates one of a magnetic flux and magnetic field, and a mechanism which detects a change in the magnetic flux or magnetic field fed back to the coordinate input part via the plate and generates signals indicating a moving direction and a moving quantity of the coordinate input part on the plate. According to the pointing device of the present invention, the moving direction and the moving quantity of the coordinate input part are detected by detecting the change in the magnetic flux or the magnetic field, and there is no need to make a detection using a mechanical part such as a ball. For this reason, the deterioration in the detection accuracy caused by the frictional wear of the mechanical parts will not occur. In addition, it is possible to maintain the high detection accuracy without having to make the periodic maintenance that was otherwise necessary in the conventional case to remove the dust particles and the like. Further, since the present invention does not use a photocoupler, it is possible to avoid the deterioration in the detection accuracy that was conventionally caused by the deterioration of the photocoupler itself with time (age). Therefore, virtually no maintenance is required, and it is possible to always input the coordinates with a high and stable accuracy regardless of the age of the pointing device.

Still another object of the present invention is to provide a pointing device comprising a plate made of a magnetic material and having at least one surface with first grooves regularly provided along a direction y, and second grooves regularly provided along a direction x which is perpendicular to the direction y, where the first grooves have depths different from the second grooves, and a coordinate input part slidably provided on the surface of the plate, where the coordinate input part comprises a first mechanism which generates one of a magnetic flux and magnetic field, and a second mechanism which detects a change in the magnetic flux or magnetic field fed back to the coordinate input part via the plate and generates signals indicating a moving direction and a moving quantity of the coordinate input part on the plate. According to the pointing device of the present invention, the moving direction and the moving quantity of the coordinate input part are detected by detecting the change in the magnetic flux or the magnetic field, and there is no need to make a detection using a mechanical part such as a ball. For this reason, the deterioration in the detection accuracy caused by the frictional wear of the mechanical parts will not occur. In addition, it is possible to maintain the high detection accuracy without having to make the periodic maintenance that was otherwise necessary in the conventional case to remove the dust particles and the like. Further, since the present invention does not use a photocoupler, it is possible to avoid the deterioration in the detection accuracy that was conventionally caused by the deterioration of the photocoupler itself with time (age). Therefore, virtually no maintenance is required, and it is possible to always input the coordinates with a high and stable accuracy regardless of the age of the pointing device. Moreover, the grooves of the plate can easily and accurately be formed using known techniques such as etching. Hence, the plate can be produced at a relatively low cost.

A further object of the present invention is to provide a pointing device comprising a plate, made of a magnetic material, having at least one surface with first grooves regularly provided along a direction y and having depths increasing towards a direction +y or −y, and second grooves regularly provided along a direction x which is perpendicular to the direction y and having depths increasing towards a direction +x or −x, where the first grooves have depths different from the second grooves, the directions +y and −y respectively indicate positive and negative directions along the direction y and the directions +x and −x respectively indicate positive and negative directions along the direction x, and a coordinate input part slidably provided on the surface of the plate, where the coordinate input part comprises a first mechanism which generates one of a magnetic flux and magnetic field, and a second mechanism which detects a change in the magnetic flux or magnetic field fed back to the coordinate input part via the plate and generates signals indicating a moving direction and a moving quantity of the coordinate input part on the plate. According to the pointing device of the present invention, the moving direction and the moving quantity of the coordinate input part are detected by detecting the change in the magnetic flux or the magnetic field, and there is no need to make a detection using a mechanical part such as a ball. For this reason, the deterioration in the detection accuracy caused by the frictional wear of the mechanical parts will not occur. In addition, it is possible to maintain the high detection accuracy without having to make the periodic maintenance that was otherwise necessary in the conventional case to remove the dust particles and the like. Further, since the present invention does not use a photocoupler, it is possible to avoid the deterioration in the detection accuracy that was conventionally caused by the deterioration of the photocoupler itself with time (age). Therefore, virtually no maintenance is required, and it is possible to always input the coordinates with a high and stable accuracy regardless of the age of the pointing device. Moreover, the grooves of the plate can easily and accurately be formed using known techniques such as etching. Hence, the plate can be produced at a relatively low cost.

Other objects and further features of the present invention will be apparent from the following detailed description when read in conjunction with the accompanying drawings.

BRIEF DESCRIPTION OF THE DRAWINGS

FIGS. 8A and 8B respectively are perspective views showing the plate;

FIG. 53 is a diagram showing a portion of the plate shown in FIG. 51 on an enlarged scale;

FIG. 54 is a diagram for explaining a discrimination table;

DESCRIPTION OF THE PREFERRED EMBODIMENTS

First, a description will be given of a first embodiment of a pointing device according to the present invention, by referring to FIGS. 5 through 42.

Figure 5:
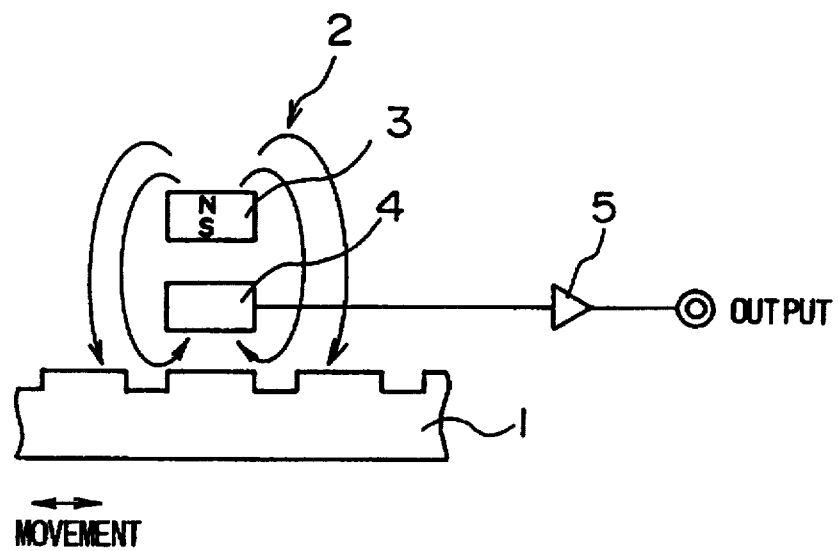
FIG. 5 is a diagram showing a part of a first embodiment of the pointing device according to the present invention.

FIG. 5 shows a part of the first embodiment with a plate shown in cross section. In FIG. 5, a metal detection plate 1 is made of a magnetic material such as FeCoNi. A plurality of parallel grooves, respectively parallel the x-axis and the y-axis, are provided on the surface of the plate 1 in the form of a checker board. On the other hand, a coordinate input part 2 has a detector which generally includes a permanent magnet 3, a Hall element 4 and an amplifier 5.

Figure 6:
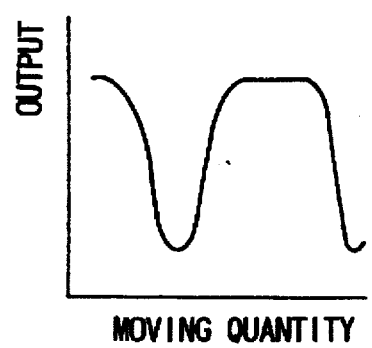
FIG. 6 is a diagram showing the relationship between a moving quantity of a coordinate input part and an output of a detector.

As shown in FIG. 5, the magnetic flux from the permanent magnet 3 is fed back to the permanent magnet 3 via the plate 1. Since the Hall element 4 is positioned between the permanent magnet 3 and the plate 1, it is possible to recognize the magnetic flux fed back to the permanent magnet 3 via the plate with a satisfactory efficiency. Because the plurality of grooves are provided on the plate 1, the magnetic flux from the permanent magnet 3 alternately pass through the groove portion and the non-groove portion of the plate 1 as the coordinate input part 2 is moved on the plate 1. In this embodiment and the embodiments described hereunder, the coordinate input part 2 slides on the surface of the plate 1 as the coordinate input part 2 is moved by the user. Accordingly, an output signal of the amplifier 5 which receives an output signal of the Hall element 4 changes as shown in FIG. 6 depending on the moving quantity and the moving distance of the coordinate input part 2. In this embodiment, the moving direction and the moving quantity of the coordinate input part 2 with respect to the plate 1 are detected by use of the change in the output of the amplifier 5.

Figure 7:
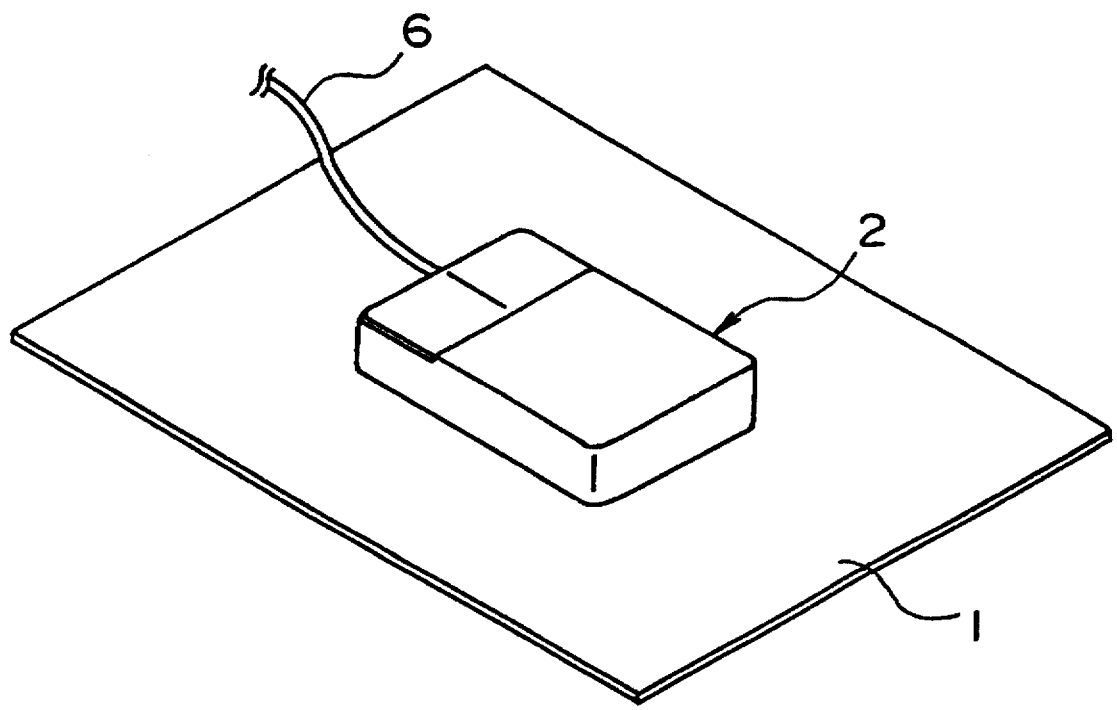
FIG. 7 is a perspective view showing a plate and the coordinate input part.

FIG. 7 shows a perspective view of the plate 1 and the coordinate input part 2 of the first embodiment. The output signal of the amplifier 5 shown in FIG. 5 is supplied to a terminal equipment (not shown) including OA equipments such as a personal computer via a cord 6.

FIGS. 8A and 8B respectively are perspective views showing the construction of the plate 1. As shown in FIG. 8A, a plurality of grooves 11 parallel to the x-axis are provided along the y-axis at constant intervals on the plate 1, and a plurality of grooves 12 parallel to the y-axis are provided along the xaxis at constant intervals. FIG. 8B shows an encircled portion of FIG. 8A on an enlarged scale. As shown in FIG. 8B, the grooves 11 and 12 are formed in a base layer 1-1, and a coating layer 1-2 which functions as a protection layer is formed on the base layer 1-1.

Figures 9A, 9B, 9C:
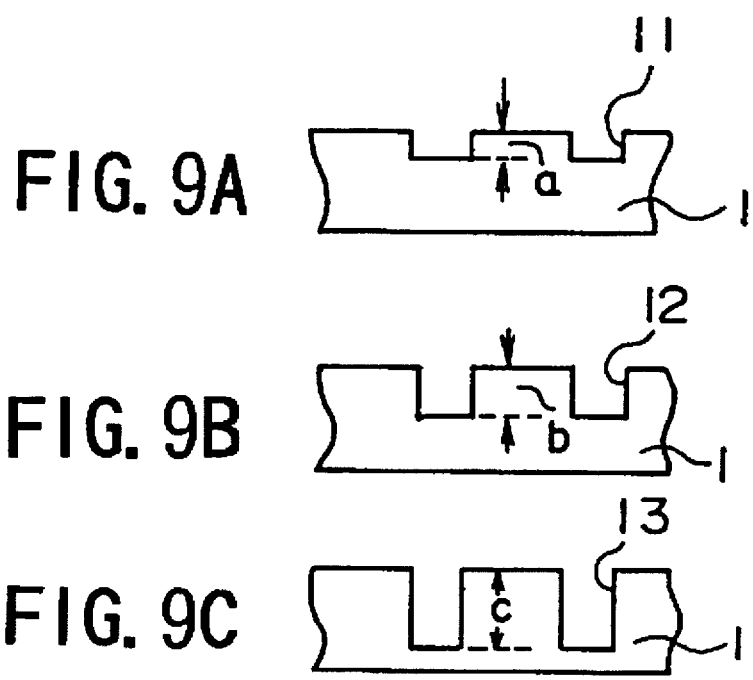
FIGS. 9A through 9C respectively are cross sectional views for explaining depths of grooves and intersections of the plate.

In this embodiment, the depths of the grooves 11 and 12 are set as shown in FIGS. 9A through 9C. FIG. 9A shows a cross section of the groove 11, and FIG. 9B shows a cross section of the groove 12. In addition, FIG. 9C shows a cross section of an intersection 13 of the grooves 11 and 12. The groove 11 has a depth a as shown in FIG. 9A, and the groove 12 has a depth b as shown in FIG. 9B, where the depth a is set smaller than the depth b. Accordingly, the intersection 13 of the grooves 11 and 12 has a depth c shown in FIG. 9C which is described by c=a+b.

Figure 10A:
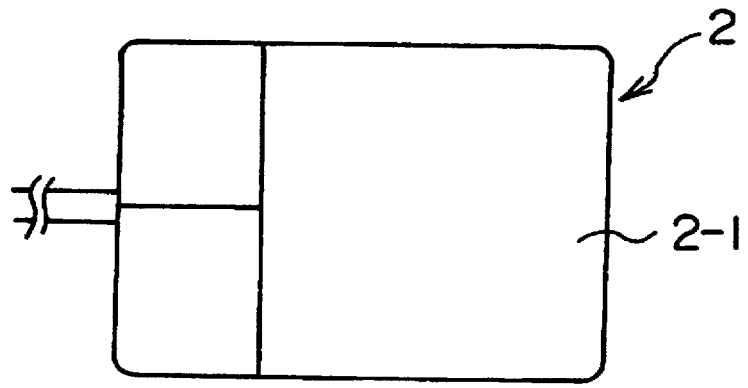
FIGS. 10A through 10C respectively are diagrams showing the construction of the coordinate input part.
Figure 10B:
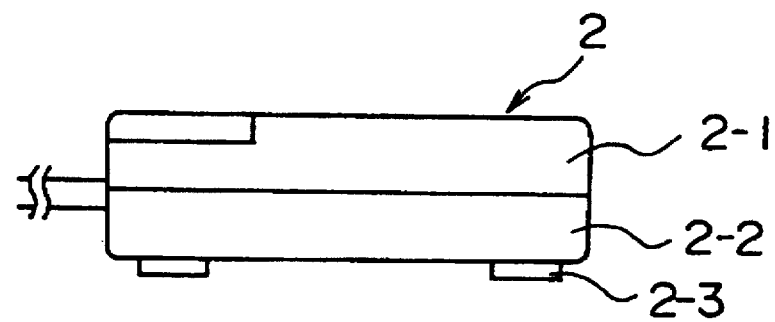
Figure 10C:
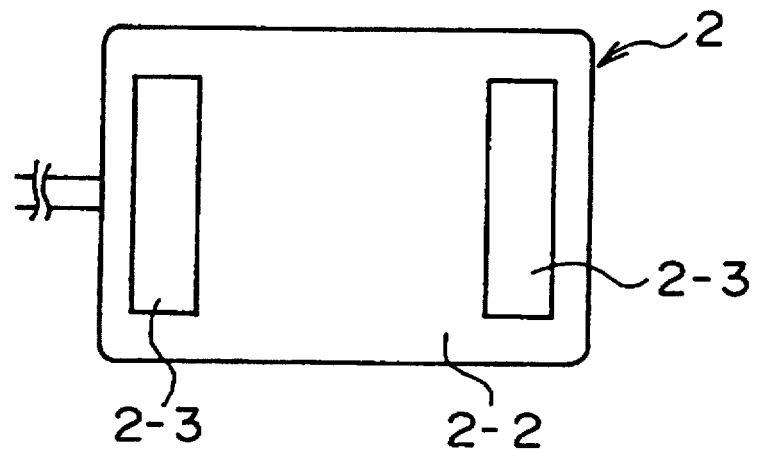

FIGS. 10A through 10C are diagrams showing the construction of the coordinate input part 2. FIG. 10A shows a plan view of the coordinate input part 2, FIG. 10B shows a side view of the coordinate input part 2, and FIG. 10C shows a bottom view of the coordinate input part 2. As shown in FIG. 10B, the coordinate input part 2 generally includes a top cover 2-1, a bottom cover 2-2, and legs 2-3. The permanent magnet 3, the Hall element 4, the amplifier 5 and the like shown in FIG. 5 are accommodated within an internal space formed between the top and bottom covers 2-1 and 2-2. The legs 2-3 are made of a material such as cloth and teflon-coated material, and are provided to reduce the friction when the coordinate input part 2 moves on the plate 1. Hence, the shape and the number of the legs 2-3 are of course not limited to those shown in FIG. 10C.

Figure 1:
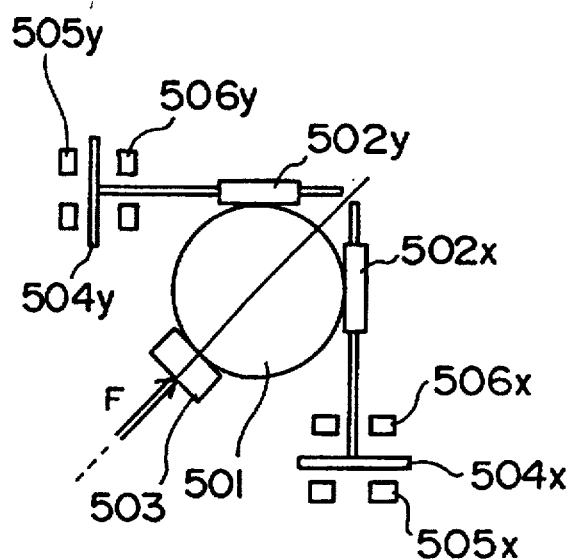
FIG. 1 is a plan view showing a part of a conventional mouse.
Figure 2:
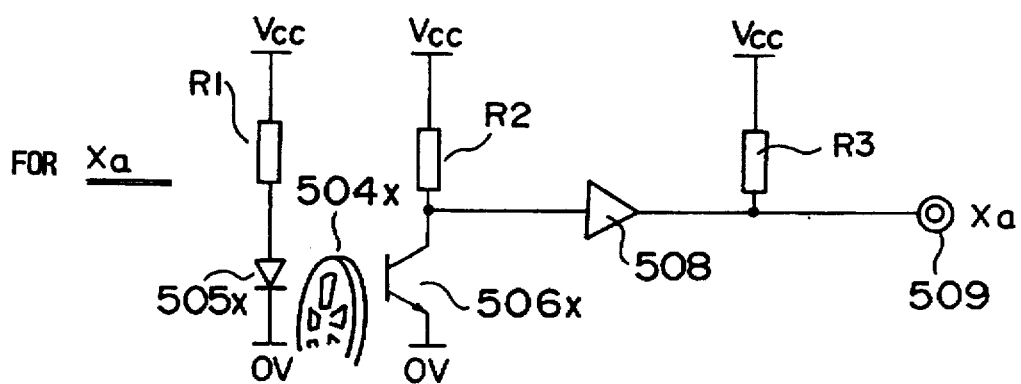
FIG. 2 is a circuit diagram showing a detection system for detecting a movement of a ball in a direction x.
Figure 3:
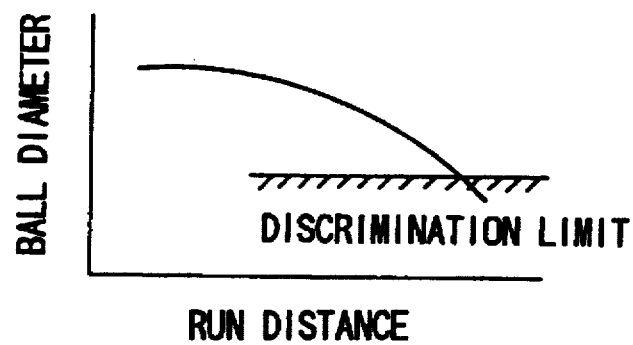
FIG. 3 is a diagram showing the relationship between a total run distance of a ball and a diameter of the ball.
Figure 4:
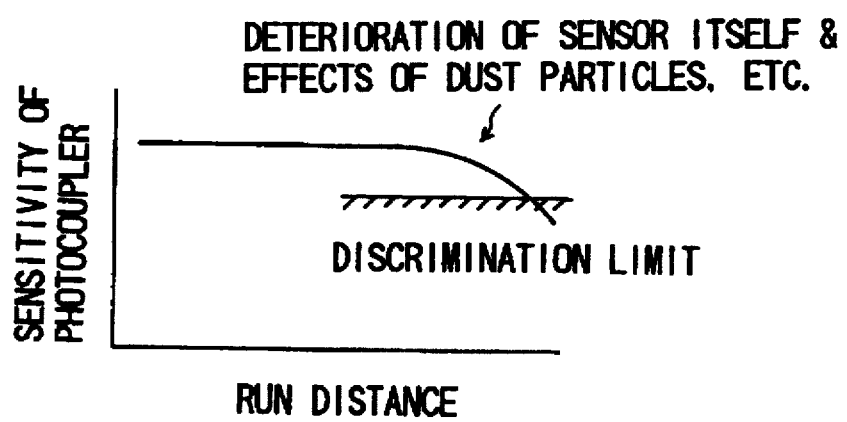
FIG. 4 is a diagram showing the relationship between the total run distance of the ball and a sensitivity of a photocoupler.
Figure 11:
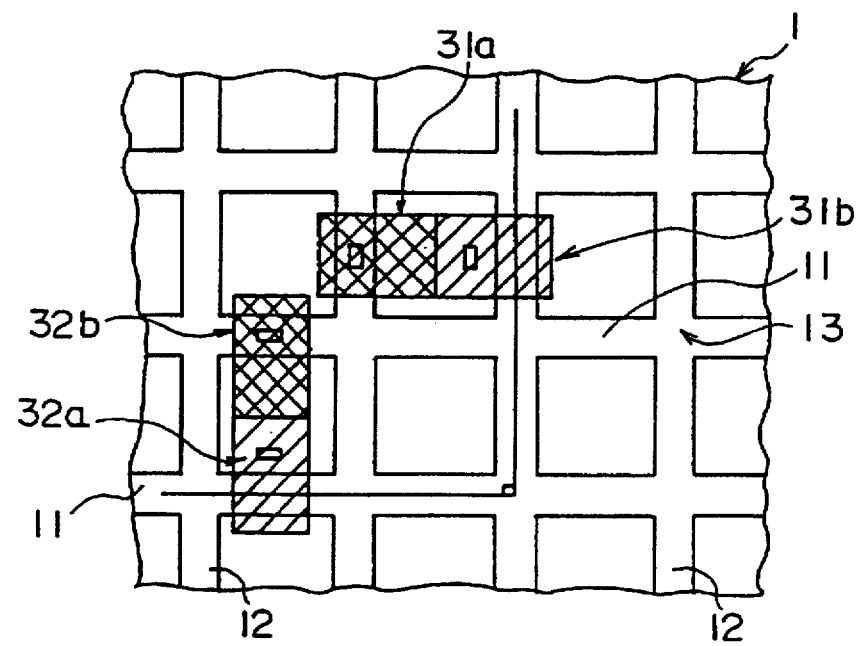
FIG. 11 is a plan view showing an arrangement of the detector with respect to the grooves of the plate.

As described above in conjunction with FIGS. 5 and 6, it is possible to detecting the moving quantity of the coordinate input part 2 by counting the number of grooves 12 traversed using the structure shown in FIG. 1. However, by use of the structure shown in FIG. 5 alone, it is not possible to detect the moving direction of the coordinate input part 2. Hence, as shown in FIG. 11, a pair of detectors 31a and 31b are provided within the coordinate input part 2 for detecting the moving quantity and moving direction with respect to the x-axis, and a pair of detectors 32a and 32b are provided within the coordinate input part 2 for detecting the moving quantity and moving direction with respect to the y-axis. The detectors 31a and 31b have an arrangement such that one of the detectors 31a and 31b is on the non-groove portion of the plate 1 while the other is on the groove 12 of the plate 1. Similarly, the detectors 32a and 32b have an arrangement such that one of the detectors 32a and 32b is on the non-groove portion of the plate 1 while the other is on the groove 11 of the plate 1. In other words, the distance (pitch) of the Hall elements of the detectors 31a and 31b is set to a value different from the distance (pitch) of the mutually adjacent grooves 12 on the plate 1. In addition, the distance (pitch) of the Hall elements of the detectors 32a and 32b is set to a value different from the distance (pitch) of the mutually adjacent grooves 11 on the plate 1. Furthermore, an imaginary line on which the detectors 31a and 31b are arranged is perpendicular to an imaginary line on which the detectors 32a and 32b are arranged.

Figure 12:
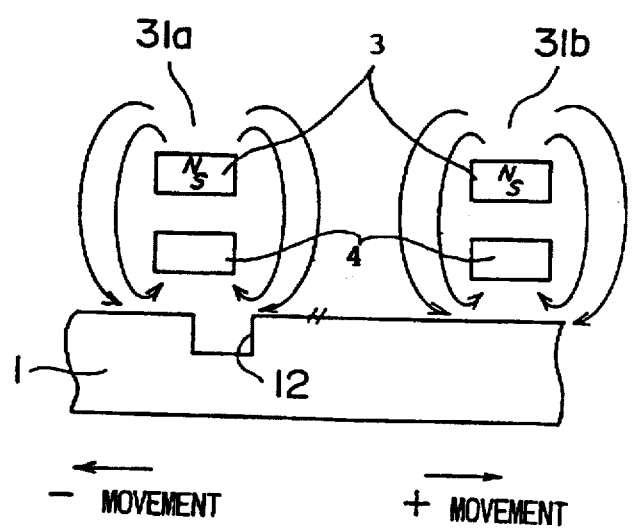
FIG. 12 is a diagram for explaining the positional relationship of the detector and the plate.
Figure 13:
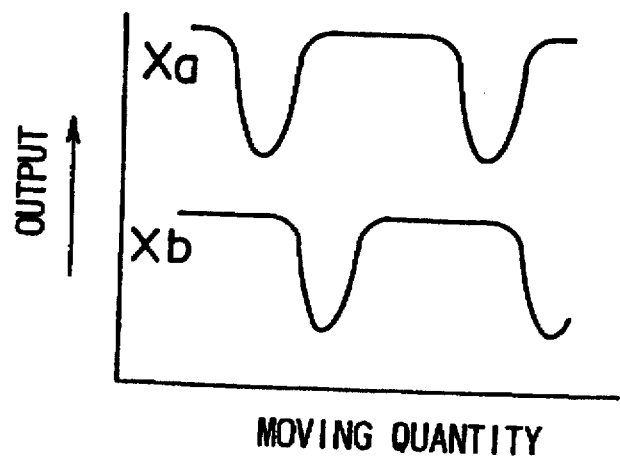
FIG. 13 is a diagram showing the relationship of a moving quantity and an output of the detector when the coordinate input part moves in a direction −x.
Figure 14:
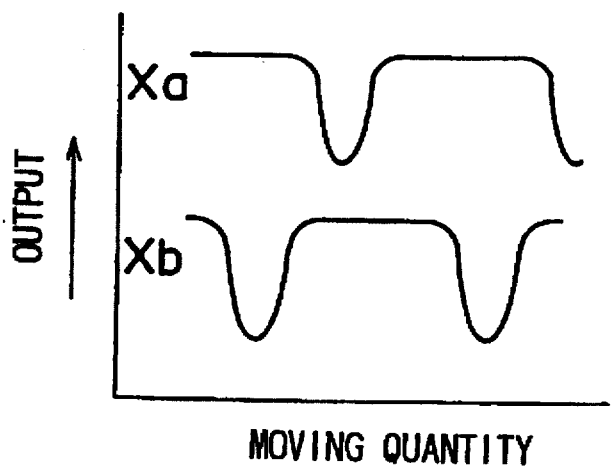
FIG. 14 is a diagram showing the relationship of the moving quantity and the output of the detector when the coordinate input part moves in a direction +x.

Accordingly, when the detectors 31a and 31b have the positional relationship shown in FIG. 12 with respect to the plate 1, for example, and the coordinate input part 2 moves in a negative direction along the x-axis (hereinafter simply referred to as a direction −x), output signals Xa and Xb of the detectors 31a and 31b change as shown in FIG. 13. In addition, when the coordinate input part 2 moves in a positive direction along the x-axis (hereinafter simply referred to as a direction +x), the output signals Xa and Xb of the detectors 31a and 31b change as shown in FIG. 14. As may be seen by comparing FIGS. 13 and 14, the phase relationship of the rising and falling edges of the output signals Xa and Xb of the detectors 31a and 31b becomes reversed between the case where the coordinate input part 2 moves in the direction +x and the case where the coordinate input part 2 moves in the direction −x. For this reason, it is possible to detect both the moving direction and moving quantity of the coordinate input part 2 with respect to the x-axis based on the output signals Xa and Xb of the detectors 31a and 31b.

The moving direction and the moving quantity of the coordinate input part 2 with respect to the y-axis can be detected similarly based on output signals Ya and Yb of the detectors 32a and 32b.

Figure 15A:
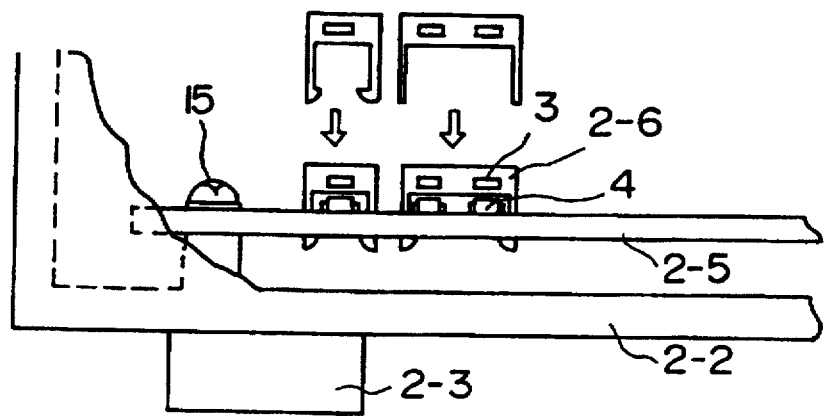
FIGS. 15A and 15B respectively are diagrams showing the construction of the detector.
Figure 15B:
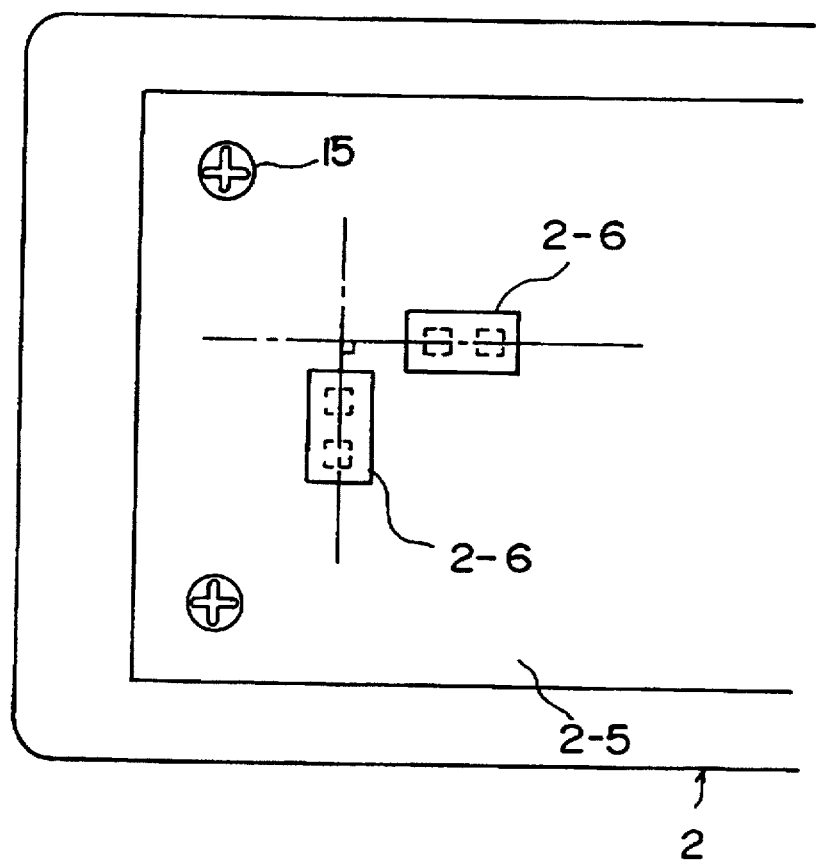

FIGS. 15A and 15B respectively are diagrams showing an embodiment of the construction of the detectors 31a and 31b and the detectors 32a and 32b. FIG. 15A shows a partial cross section of the coordinate input part 2, and FIG. 15B shows a plan view of the inside of the coordinate input part 2 with the top cover 2-1 removed. As shown in FIGS. 15A and 15B, a pair of magnet holders 2-6 are plugged into a printed circuit board 2-5. Each magnet holder 2-6 holds the permanent magnets 3 and the Hall elements 4 with a predetermined positional relationship. Circuits such as the amplifier 5 shown in FIG. 5 are formed on the printed circuit board 2-5, and the above described detectors 31a and 31b and the detectors 32a and 32b are formed by the magnet holders 2-6 and the circuits provided on the printed circuit board 2-5. As shown in FIGS. 15A and 15B, the printed circuit board 2-5 is mounted on the bottom cover 2-2 by screws 15.

Figure 16:
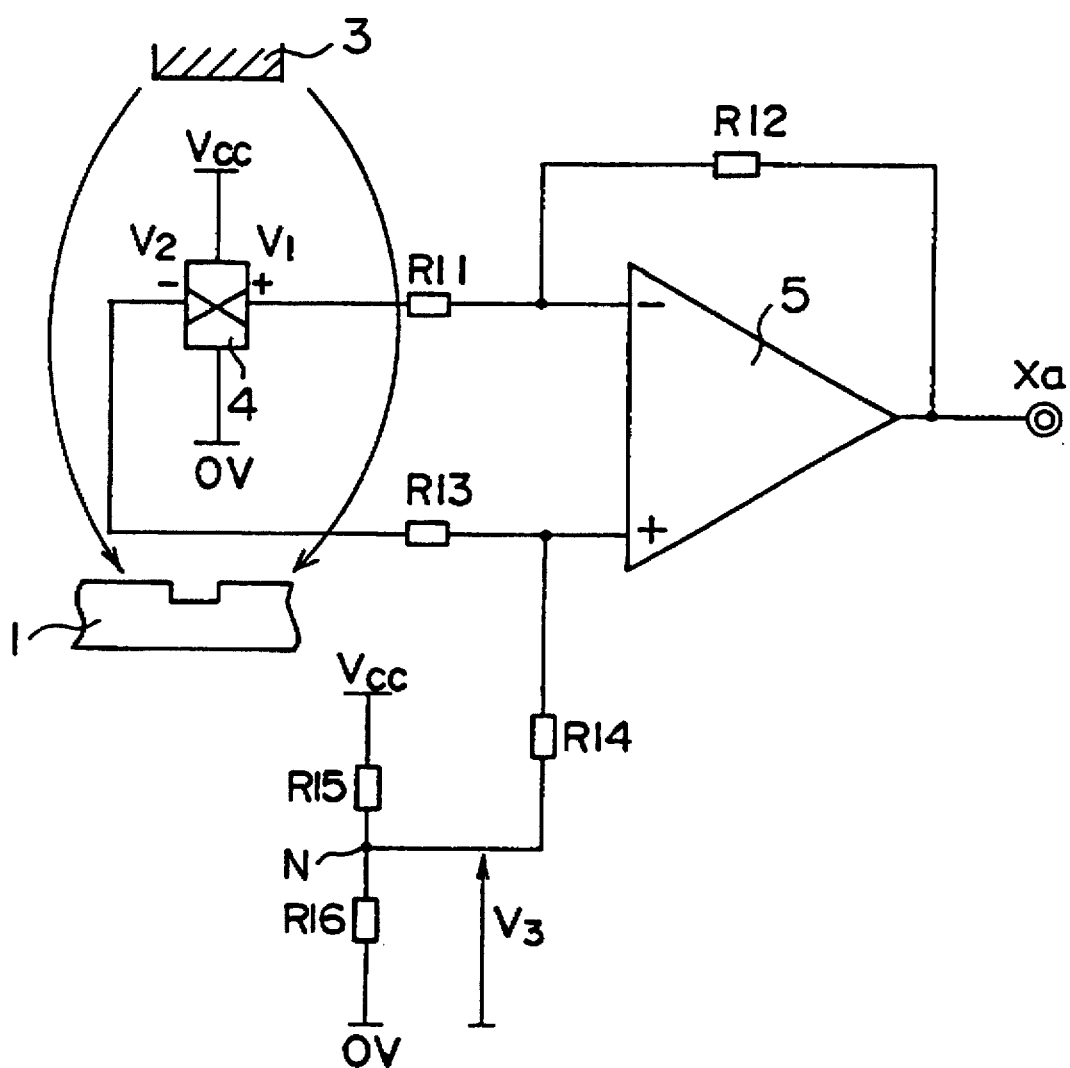
FIG. 16 is a circuit diagram showing the construction of the detector in more detail.

Next, a more detailed description will be given of the construction of the detectors 31a and 31b and the detectors 32a and 32b, by referring to FIG. 16. Because each of the detectors 31a, 31b, 32a and 32b have the same construction, only the construction of the detector 31a will be described. In FIG. 16, those parts which are the same as those corresponding parts in FIG. 5 are designated by the same reference numerals, and a description thereof will be omitted.

In FIG. 16, the Hall element 4 has one end connected to the power supply voltage Vcc, and the other end grounded. An output voltage V1 of the Hall element 4 is applied to an inverting input terminal of a differential amplifier 5 via a resistor R11, and an output voltage V2 is applied to a non-inverting input terminal of the differential amplifier 5 via a resistor R13. An output voltage Xa of the differential amplifier 5 is fed back to the inverting input terminal of the differential amplifier 5 via a resistor R12. In addition, resistors R15 and R16 are connected in series between the power supply voltage Vcc and the ground. A node N connecting the resistors R15 and R16 is connected to the non-inverting input terminal of the differential amplifier 5 via a resistor R14. The output voltage Xa of the detector 31a can be described by Xa=(V1−V2)·αV3, where V3 denotes the potential between the node N and the ground, a=R2/R1= R4/R3, and R1 through R4 respectively denote the resistances of the resistors R11 through R14.

In this embodiment, the base layer 1-1 of the plate 1 is grounded. However, it is possible to hold the potential of the base layer 1-1 to an arbitrary value other than the ground potential.

Figure 17:
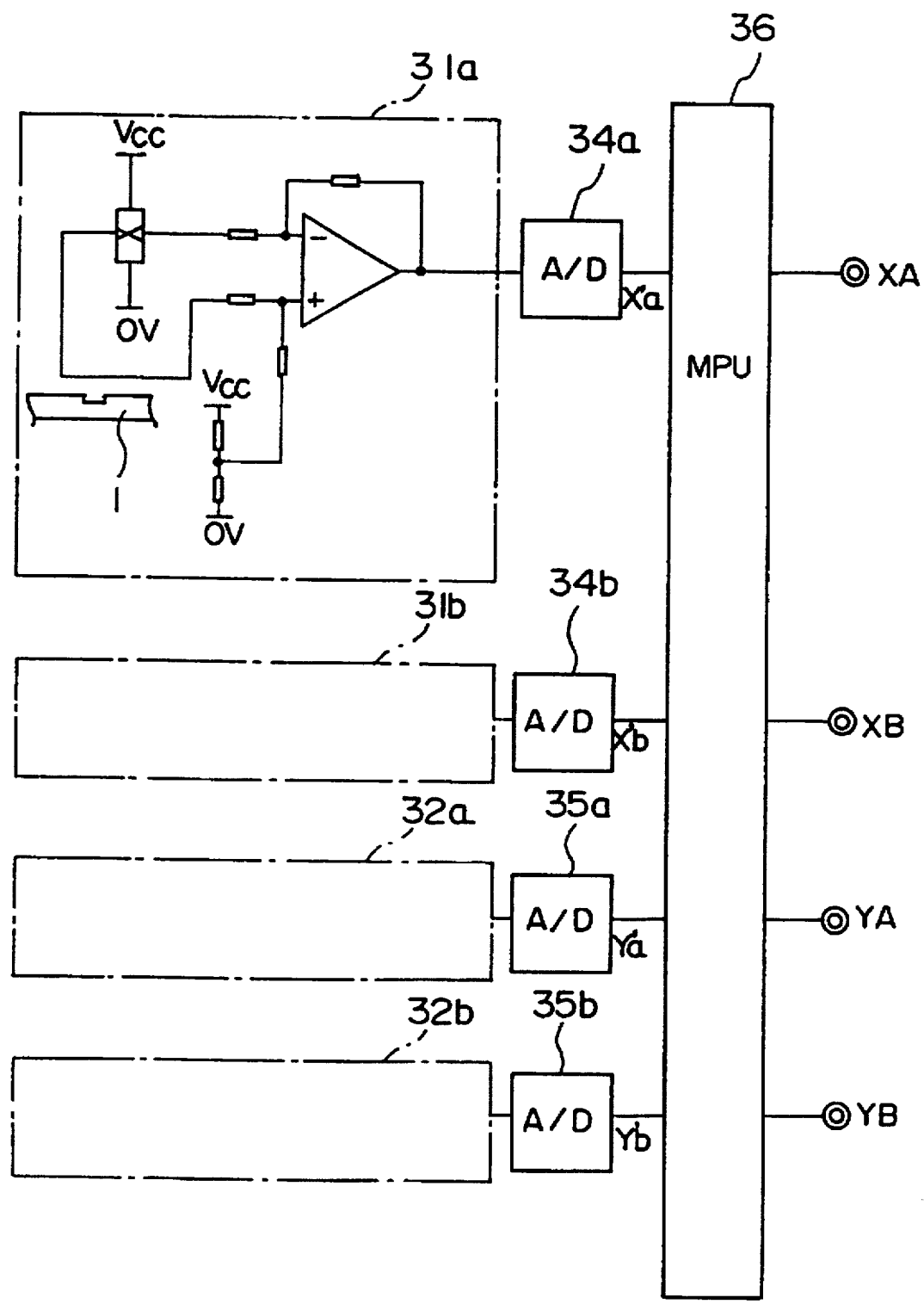
FIG. 17 is a system block diagram showing the construction of a detector system.

FIG. 17 shows a detector system for obtaining the moving direction and the moving quantity of the coordinate input part 2 based on the output signals Xa, Xb, Ya and Yb of the detectors 31a, 31b, 32a and 32b. In FIG. 17, the output signals Xa, Xb, Ya and Yb of the detectors 31a, 31b, 32a and 32b are respectively converted into digital output signals X'a, X'b, Y'a and Y'b in analog-to-digital (A/D) converters 34a, 34b, 35a and 35b before being supplied to a microprocessor unit (MPU) 36. The MPU 36 generates signals XA, XB, YA and YB indicating the moving direction and the moving quantity of the coordinate input part 2 based on the digital output signals X'a, X'b, Y'a and Y'b. These signals XA, XB, YA and YB are supplied to a host unit (not shown), that is, a terminal equipment including an OA equipment such as a personal computer. In this embodiment, all of the circuits shown in FIG. 17 are provided on the printed circuit board 2-5 shown in FIGS. 15A and 15B.

The MPU 36 need not necessarily be provided in the pointing device, and it is also possible to carry out the operations of the MPU 36 in the host unit. In addition, it is possible to provide the functions of the A/D converters 34a, 34b, 35a and 35b in the MPU 35 and omit the A/D converters 34a, 34b, 35a and 35b.

The grooves detected by the detectors 31a and 31b are not necessarily the grooves 12, and the grooves 11 will also be detected. But since the depth b of the groove 12 is different from the depth a of the groove 11, the levels of the output signals Xa and Xb obtained when the groove 12 is detected will be different from the levels of the output signals Xa and Xb obtained when the groove 11 is detected. Hence, by neglecting the output signals Xa and Xb having levels lower than the levels which will be obtained when the groove 12 is detected, the MPU 36 can accurately detect the moving direction and the moving quantity of the coordinate input part 2 with respect to the x-axis.

Similarly, the grooves detected by the detectors 32a and 32b are not necessarily the grooves 11, and the grooves 12 will also be detected. But since the depth a of the groove 11 is different from the depth b of the groove 12, the levels of the output signals Ya and Yb obtained when the groove 11 is detected will be different from the levels of the output signals Ya and Yb obtained when the groove 12 is detected. Hence, by neglecting the output signals Ya and Yb having levels higher than the levels which will be obtained when the groove 11 is detected, the MPU 36 can accurately detect the moving direction and the moving quantity of the coordinate input part 2 with respect to the y-axis.

Furthermore, because the intersection 13 of the grooves 11 and 12 has the depth c described by c=a+b, the MPU 36 can discriminate the intersection 13 by detecting the output signals Xa, Xb, Ya and Yb having levels corresponding to this depth c.

In this embodiment, the moving direction and the moving quantity of the coordinate input part 2 with respect to the plate 1 are detected using the differences in the depths of the grooves 11 and 12. For this reason, it is possible to make the pitches of the grooves 11 and 12 extremely narrow and to detect the moving direction and the moving quantity with a high resolution. For example, when forming the grooves 11 and 12 on the plate 1 at extremely narrow pitches, it is possible to employ known techniques such as etching that is used to produce semiconductor devices.

Figure 18:
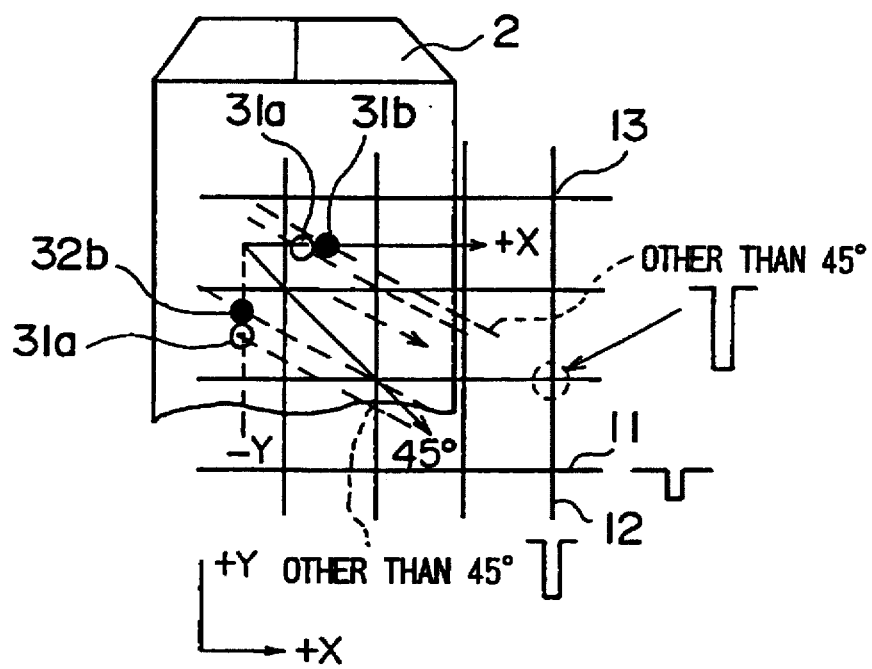
FIG. 18 is a plan view showing the coordinate input part located at a predetermined position on the plate.

FIGS. 18 through 22 are diagrams for explaining the operation of the detector system when the coordinate input part 2 moves in various directions from a predetermined position on the plate 1. FIG. 18 is a plan view showing the coordinate input part 2 located at the predetermined position on the plate 1. When the coordinate input part 2 is located at the predetermined position shown in FIG. 18, all of the detectors 31a, 31b, 32a and 32b are positioned on the non-groove portions of the plate 1. FIGS. 19 through 22 respectively are diagrams showing the phase relationship of the digital output signals X'a, X'b, Y'a and Y'b which are supplied from the A/D converters 34a, 34b, 35a and 35b to the MPU 36 when the coordinate input part 2 is moved in various directions from the predetermined position.

Figure 19:
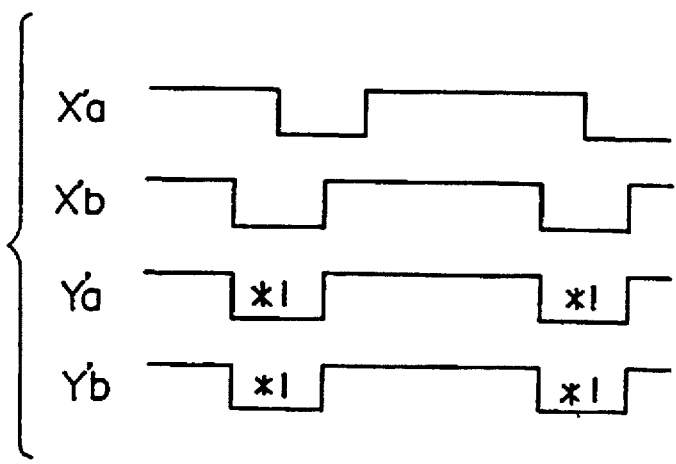
FIG. 19 is a diagram showing the phase relationship of digital output signals supplied from an analog-to-digital (A/D) converter to a microprocessor unit (MPU) when the coordinate input part moves in the direction +x from the predetermined position.

When the coordinate input part 2 is moved from the predetermined position in the direction +x in FIG. 18, the digital output signals X'a, X'b, Y'a and Y'b undergo transitions as shown in FIG. 19. In FIG. 19, *1 indicates that the digital output signals Y'a and Y'b are neglected within the MPU 36.

Figure 20:
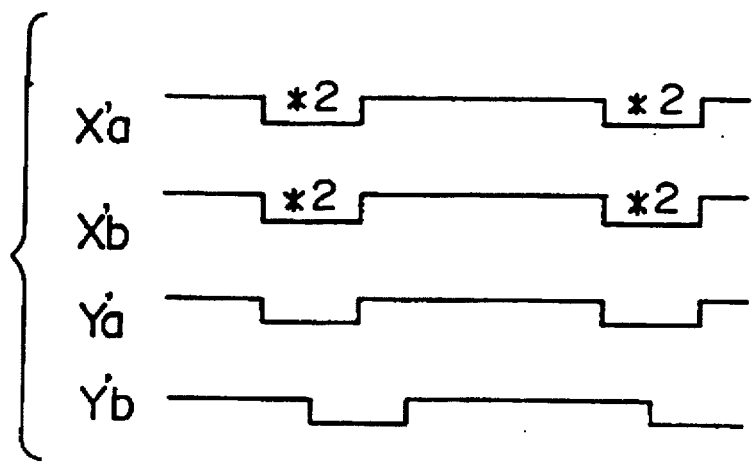
FIG. 20 is a diagram showing the phase relationship of the digital output signals supplied from the A/D converter to the MPU when the coordinate input part moves in a direction −y from the predetermined position.

When the coordinate input part 2 is moved from the predetermined position in the direction -y in FIG. 18, the digital output signals X'a, X'b, Y'a and Y'b undergo transitions as shown in FIG. 20. In FIG. 20, *2 indicates that the digital output signals X'a and X'b are neglected within the MPU 36.

Figure 21:
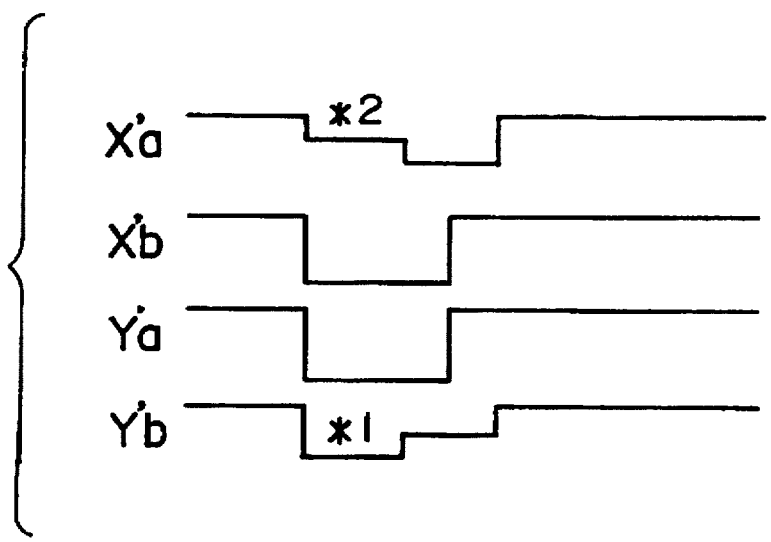
FIG. 21 is a diagram showing the phase relationship of the digital output signals supplied from the A/D converter to the MPU when the coordinate input part moves in a 45° direction from the predetermined position.

When the coordinate input part 2 is moved from the predetermined position in the 45° direction in FIG. 18, the digital output signals X'a, X'b, Y'a and Y'b undergo transitions as shown in FIG. 21. In FIG. 21, *1 indicates that the digital output signal Y'b is neglected within the MPU 36, and *2 indicates that the digital output signal X'a is neglected within the MPU 36.

Figure 22:
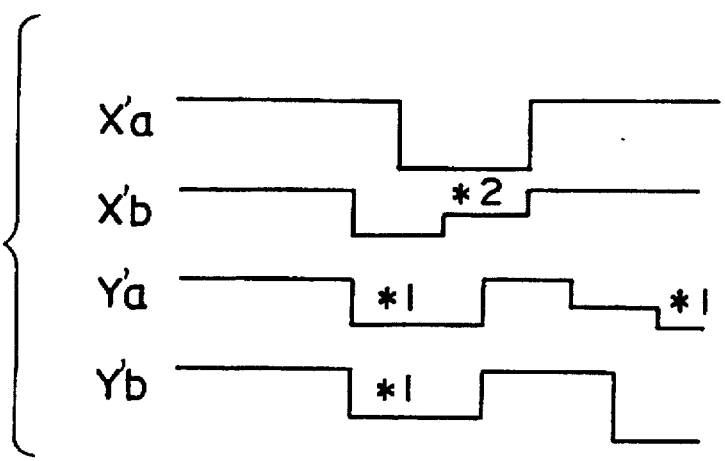
FIG. 22 is a diagram showing the phase relationship of the digital output signals supplied from the A/D converter to the MPU when the coordinate input part moves in a direction other than the 45° direction from the predetermined position.

When the coordinate input part 2 is moved from the predetermined position in the direction other than the 45° direction in FIG. 18, the digital output signals X'a, X'b, Y'a and Y'b undergo transitions as shown in FIG. 22. In FIG. 22, *1 indicates that the digital output signals Y'a and Y'b are neglected within the MPU 36, and *2 indicates that the digital output signal X'b is neglected within the MPU 36.

Figure 23:
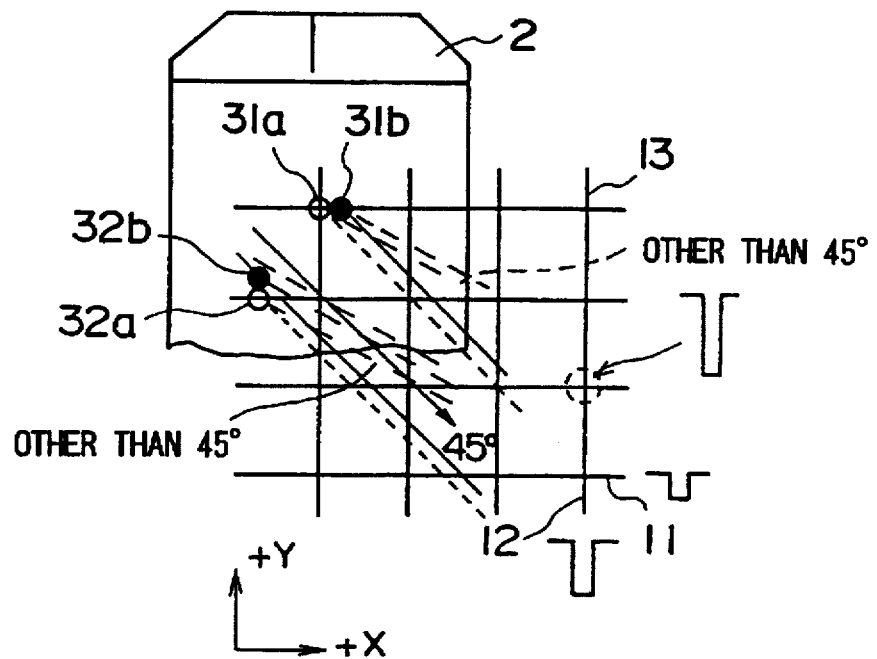
FIG. 23 is a plan view showing the coordinate input part located at a predetermined position on the plate.

FIGS. 23 through 27 are diagrams for explaining the operation of the detector system when the coordinate input part 2 moves in various directions from a predetermined position on the plate 1. FIG. 23 is a plan view showing the coordinate input part 2 located at the predetermined position on the plate 1. When the coordinate input part 2 is located at the predetermined position shown in FIG. 23, the detectors 31a and 32a are positioned on the groove portions of the plate 1, but the detectors 31b and 32b are positioned on the non-groove portions of the plate 1. FIGS. 24 through 27 respectively are diagrams showing the phase relationship of the digital output signals X'a, X'b, Y'a and Y'b which are supplied from the A/D converters 34a, 34b, 35a and 35b to the MPU 36 when the coordinate input part 2 is moved in various directions from the predetermined position.

Figure 24:
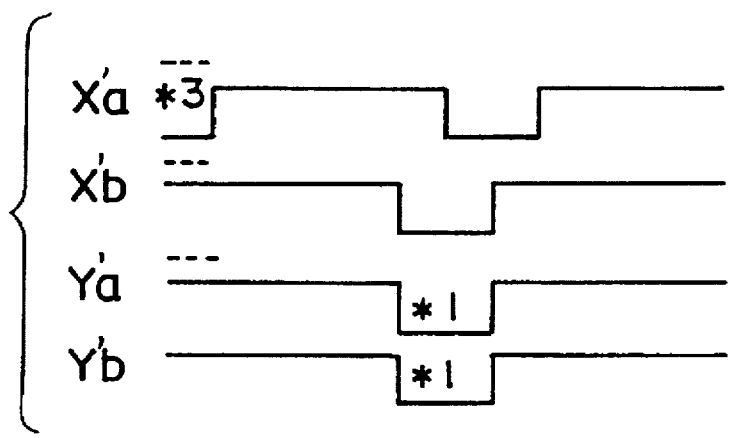
FIG. 24 is a diagram showing the phase relationship of the digital output signals supplied from the A/D converter to the MPU when the coordinate input part moves in the direction +x from the predetermined position.

When the coordinate input part 2 is moved from the predetermined position in the direction +x in FIG. 23, the digital output signals X'a, X'b, Y'a and Y'b undergo transitions as shown in FIG. 24. In FIG. 24, *1 indicates that the digital output signals Y'a and Y'b are neglected within the MPU 36, and *3 indicates that the digital output signal X'a is neglected within the MPU 36 because it corresponds to the intersection 13 of the grooves 11 and 12.

Figure 25:
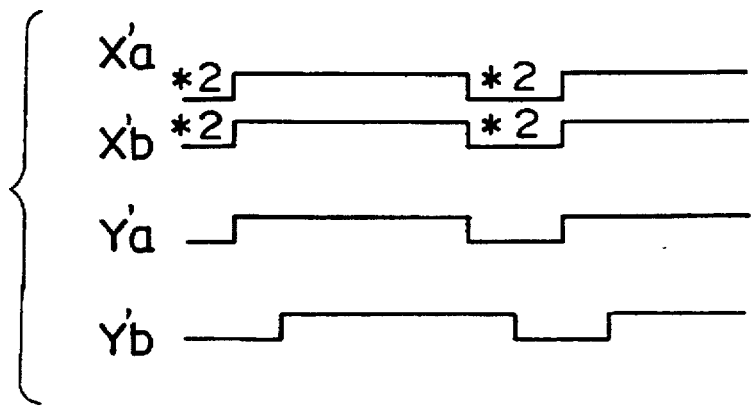
FIG. 25 is a diagram showing the phase relationship of the digital output signals supplied from the A/D converter to the MPU when the coordinate input part moves in the direction −y from the predetermined position.

When the coordinate input part 2 is moved from the predetermined position in the direction -y in FIG. 23, the digital output signals X'a, X'b, Y'a and Y'b undergo transitions as shown in FIG. 25. In FIG. 25, *2 indicates that the digital output signals X'a and X'b are neglected within the MPU 36.

Figure 26:
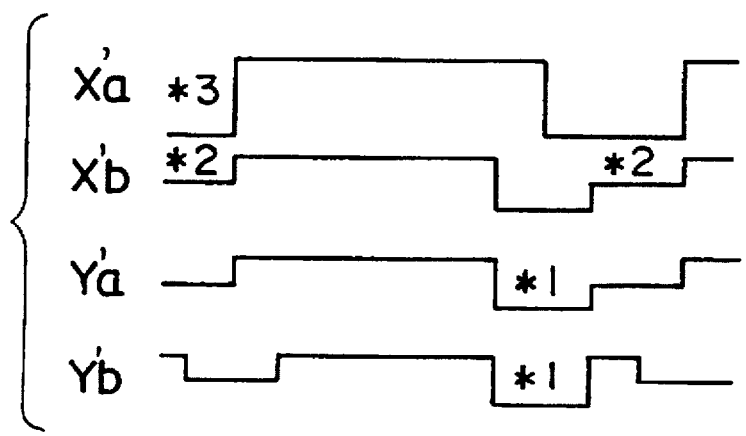
FIG. 26 is a diagram showing the phase relationship of the digital output signals supplied from the A/D converter to the MPU when the coordinate input part moves in the 45° direction from the predetermined position.

When the coordinate input part 2 is moved from the predetermined position in the 45° direction in FIG. 23, the digital output signals X'a, X'b, Y'a and Y'b undergo transitions as shown in FIG. 26. In FIG. 26, *1 indicates that the digital output signals Y'a and Y'b are neglected within the MPU 36, indicates that the digital output signal X'b is neglected within the MPU 36, and *3 indicates that the digital output signal X'a is neglected within the MPU 36 because it corresponds to the intersection 13 of the grooves 11 and 12.

Figure 27:
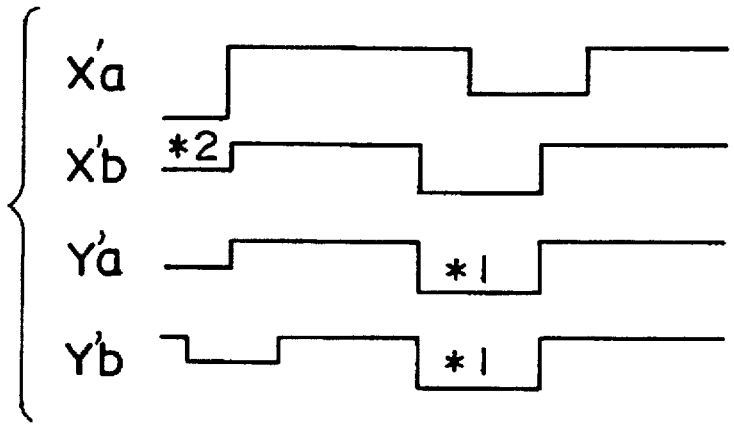
FIG. 27 is a diagram showing the phase relationship of the digital output signals supplied from the A/D converter to the MPU when the coordinate input part moves in the direction other than the 45° direction from the predetermined position.

When the coordinate input part 2 is moved from the predetermined position in the direction other than the 45° direction in FIG. 23, the digital output signals X'a, X'b, Y'a and Y'b undergo transitions as shown in FIG. 27. In FIG. 27, *1 indicates that the digital output signals Y'a and Y'b are neglected within the MPU 36, and *2 indicates that the digital output signal X'b is neglected within the MPU 36.

The positions of the detectors 31a, 31b, 32a and 32b with respect to the grooves 11 and 12 of the plate 1 when the coordinate input part 2 is located at the predetermined position are of course not limited to those shown in FIGS. 11, 15, 18 and 23. In other words, the detectors 31a and 31b may not always be positioned parallel to the grooves 11. In addition, the detectors 32a and 32b may not always be positioned parallel to the grooves 12.

Figure 28:
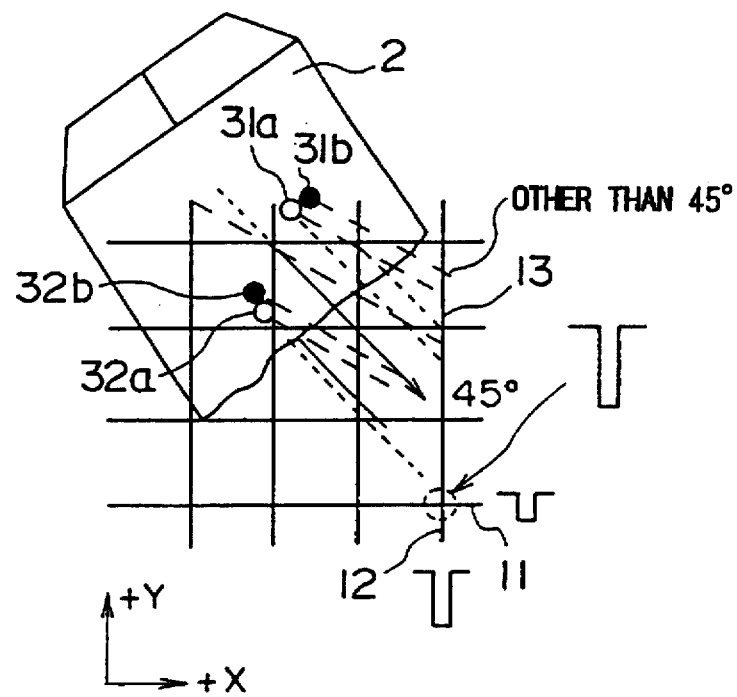
FIG. 28 is a plan view showing the coordinate input part located at a predetermined position on the plate.

FIGS. 28 through 32 are diagrams for explaining the operation of the detector system when the coordinate input part 2 moves in various directions from a predetermined position on the plate 1. FIG. 28 is a plan view showing the coordinate input part 2 located at the predetermined position on the plate 1. When the coordinate input part 2 is located at the predetermined position shown in FIG. 28, the detectors 31a and 32a are not positioned parallel to the grooves 11, the detectors 31b and 32b are not positioned parallel to the grooves 12, and all of the detectors 31a, 31b, 32a and 32b are positioned on the non-groove portions of the plate 1. FIGS. 29 through 32 respectively are diagrams showing the phase relationship of the digital output signals X'a, X'b, Y'a and Y'b which are supplied from the A/D converters 34a, 34b, 35a and 35b to the MPU 36 when the coordinate input part 2 is moved in various directions from the predetermined position.

Figure 29:
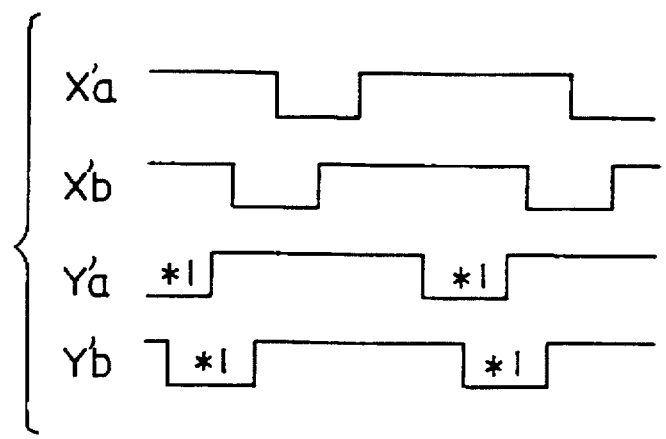
FIG. 29 is a diagram showing the phase relationship of the digital output signals supplied from the A/D converter to the MPU when the coordinate input part moves in the direction +x from the predetermined position.

When the coordinate input part 2 is moved from the predetermined position in the direction +x in FIG. 28, the digital output signals X'a, X'b, Y'a and Y'b undergo transitions as shown in FIG. 29. In FIG. 29, *1 indicates that the digital output signals Y'a and Y'b are neglected within the MPU 36, and *3 indicates that the digital output signal X'a is neglected within the MPU 36 because it corresponds to the intersection 13 of the grooves 11 and 12.

Figure 30:
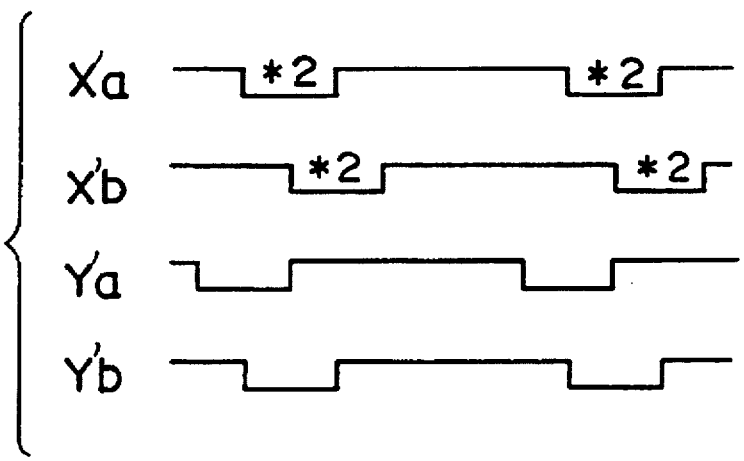
FIG. 30 is a diagram showing the phase relationship of the digital output signals supplied from the A/D converter to the MPU when the coordinate input part moves in the direction −y from the predetermined position.

When the coordinate input part 2 is moved from the predetermined position in the direction −y in FIG. 28, the digital output signals X'a, X'b, Y'a and Y'b undergo transitions as shown in FIG. 30. In FIG. 30, *2 indicates that the digital output signals X'a and X'b are neglected within the MPU 36.

Figure 31:
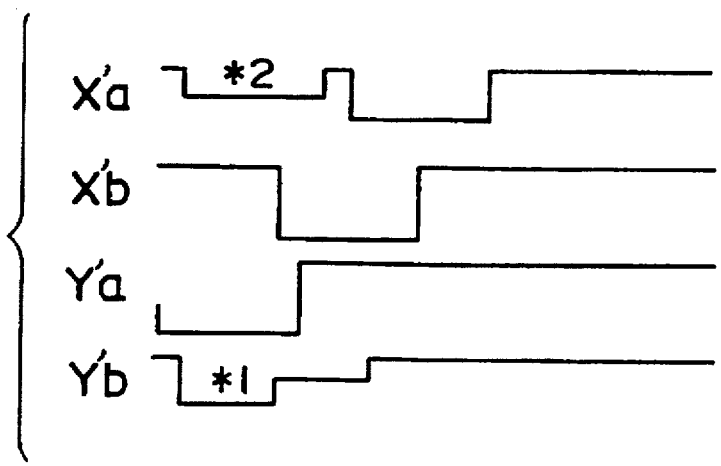
FIG. 31 is a diagram showing the phase relationship of the digital output signals supplied from the A/D converter to the MPU when the coordinate input part moves in the 45° direction from the predetermined position.

When the coordinate input part 2 is moved from the predetermined position in the 45° direction in FIG. 28, the digital output signals X'a, X'b, Y'a and Y'b undergo transitions as shown in FIG. 31. In FIG. 31, *1 indicates that the digital output signal Y'b is neglected within the MPU 36, and *2 indicates that the digital output signal X'a is neglected within the MPU 36.

Figure 32:
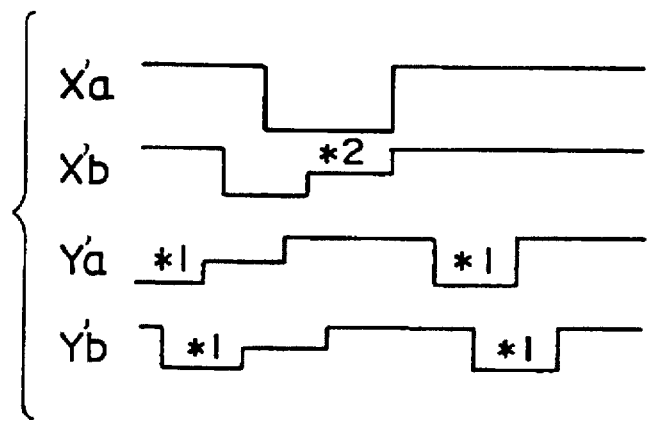
FIG. 32 is a diagram showing the phase relationship of the digital output signals supplied from the A/D converter to the MPU when the coordinate input part moves in the direction other than the 45° direction from the predetermined position.

When the coordinate input part 2 is moved from the predetermined position in the direction other than the 45° direction in FIG. 28, the digital output signals X'a, X'b, Y'a and Y'b undergo transitions as shown in FIG. 32. In FIG. 32, *1 indicates that the digital output signals Y'a and Y'b are neglected within the MPU 36, and *2 indicates that the digital output signal X'b is neglected within the MPU 36.

As clearly seen from FIGS. 18 through 32, this embodiment can accurately detect the moving direction and the moving quantity of the coordinate input part 2 with respect to the plate 1 by the MPU 36 based on the digital output signals X'a, X'b, Y'a and Y'b.

Figure 33:
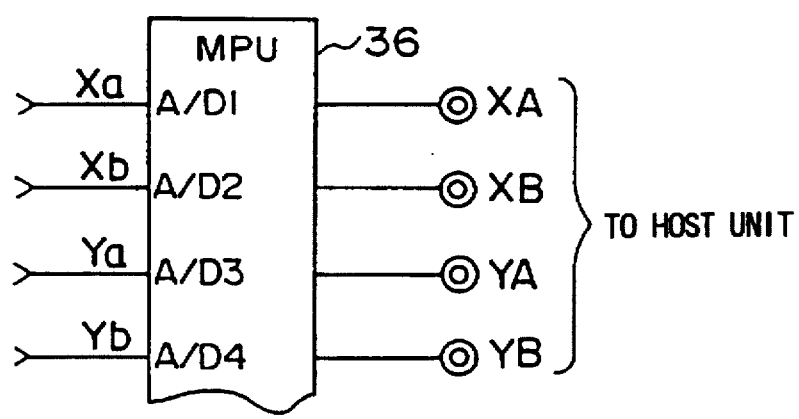
FIG. 33 is a diagram showing inputs and outputs of the MPU for a case where the functions of the A/D converter are provided within the MPU.
Figure 34:
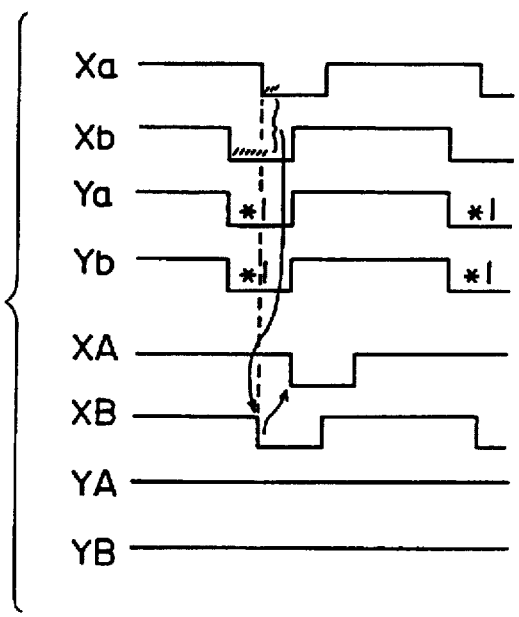
FIG. 34 is a diagram showing timings of input and output signals of the MPU shown in FIG. 33 when the coordinate input part moves in the direction +x.
Figure 35:
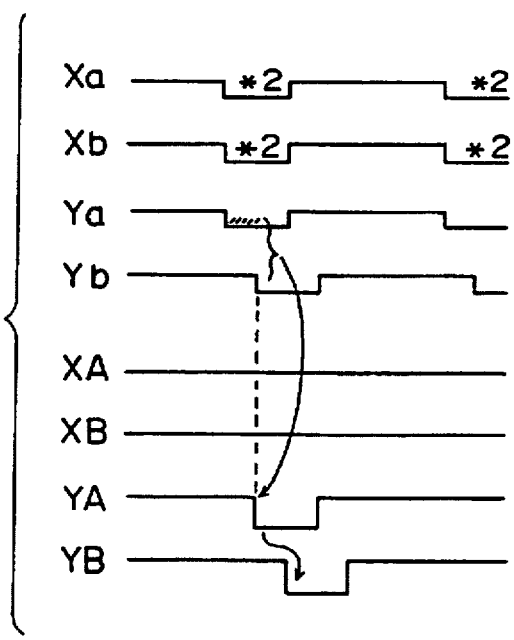
FIG. 35 is a diagram showing the timings of the input and output signals of the MPU shown in FIG. 33 when the coordinate input part moves in the direction −y.
Figure 36:
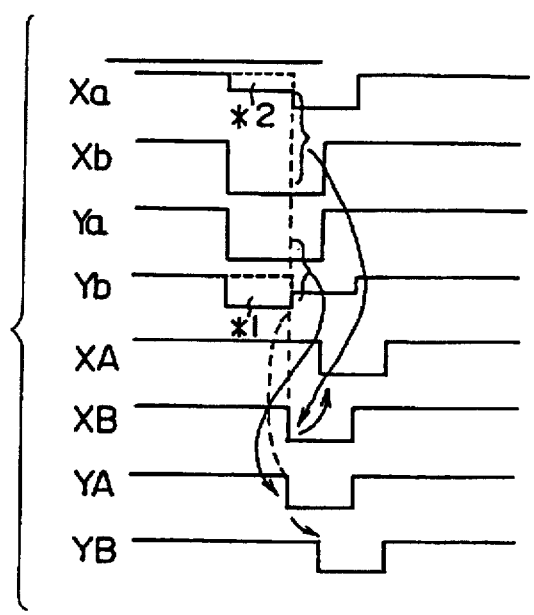
FIG. 36 is a diagram showing the timings of the input and output signals of the MPU shown in FIG. 33 when the coordinate input part moves in the 45° direction.
Figure 37:
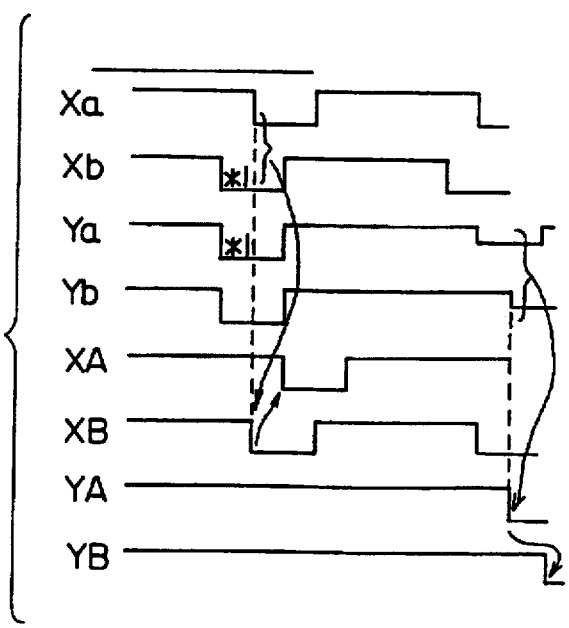
FIG. 37 is a diagram showing the timings of the input and output signals of the MPU shown in FIG. 33 when the coordinate input part moves in the direction other than the 45° direction.

Next, a description will be given of the operation of the MPU 36 for a case where the functions of the A/D converters 33a, 34b, 35a and 35b are provided within the MPU 36 and the A/D converters 34a, 34b, 35a and 35b are omitted. In this case, the inputs and outputs of the MPU 36 become as shown in FIG. 33. For the sake of convenience, it will be assumed that the coordinate input part 2 is moved from the predetermined position on the plate 1 shown in FIG. 18.

In FIG. 18, when the coordinate input part 2 is moved from the predetermined position in the direction +x, the output signals Xa, Xb, Ya and Yb of the detectors 31a, 31b, 32a and 32b input to the MPU 36 are converted into the digital output signals X'a, X'b, Y'a and Y'b within the MPU 36. These digital output signals X'a, X'b, Y'a and Y'b undergo the transitions described above in conjunction with FIG. 19. Hence, the output signals XA, XB, YA and YB of the MPU 36 undergo transitions shown in FIG. 34 in response to the transitions of the output signals Xa, Xb, Ya and Yb. In this case, the output signals XA and XB of the MPU 36 indicate the moving direction and the moving quantity of the coordinate input part 2 with respect to the x-axis.

In FIG. 18, when the coordinate input part 2 is moved from the predetermined position in the direction −y, the output signals Xa, Xb, Ya and Yb of the detectors 31a, 31b, 32a and 32b input to the MPU 36 are converted into the digital output signals X'a, X'b, Y'a and Y'b within the MPU 36. These digital output signals X'a, X'b, Y'a and Y'b undergo the transitions described above in conjunction with FIG. 20. Hence, the output signals XA, XB, YA and YB of the MPU 36 undergo transitions shown in FIG. 35 in response to the transitions of the output signals Xa, Xb, Ya and Yb. In this case, the output signals YA and YB of the MPU 36 indicate the moving direction and the moving quantity of the coordinate input part 2 with respect to the y-axis.

In FIG. 18, when the coordinate input part 2 is moved from the predetermined position in the 45° direction, the output signals Xa, Xb, Ya and Yb of the detectors 31a, 31b, 32a and 32b input to the MPU 36 are converted into the digital output signals X'a, X'b, Y'a and Y'b within the MPU 36. These digital output signals X'a, X'b, Y'a and Y'b undergo the transitions described above in conjunction with FIG. 21. Hence, the output signals XA, XB, YA and YB of the MPU 36 undergo transitions shown in FIG. 36 in response to the transitions of the output signals Xa, Xb, Ya and Yb. In this case, the output signals XA, XB, YA and YB of the MPU 36 indicate the moving direction and the moving quantity of the coordinate input part 2 with respect to the x-axis and the y-axis.

Figure 38:
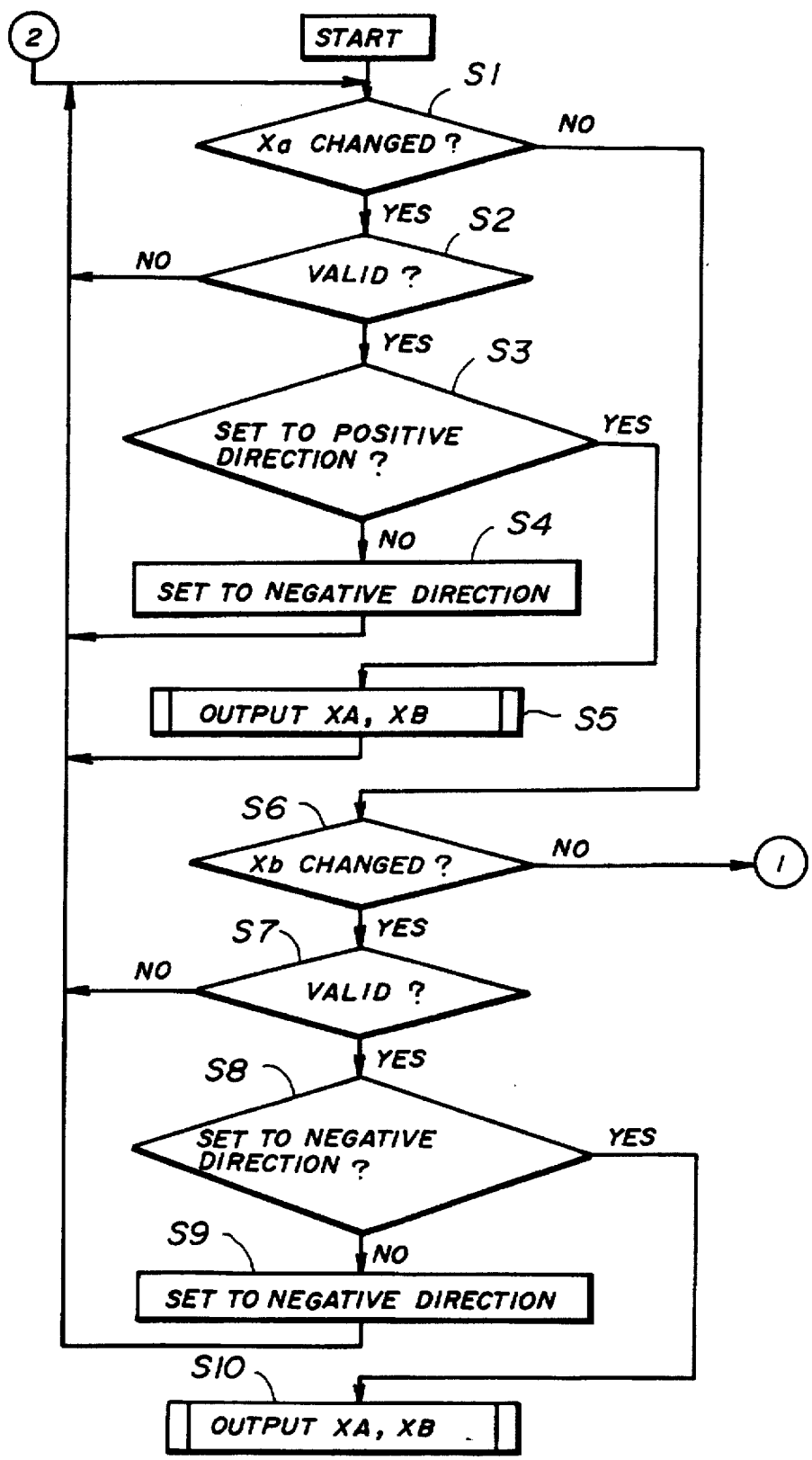
FIG. 38 is a flow chart for explaining the operation of generating output signals of the MPU.
Figure 39:
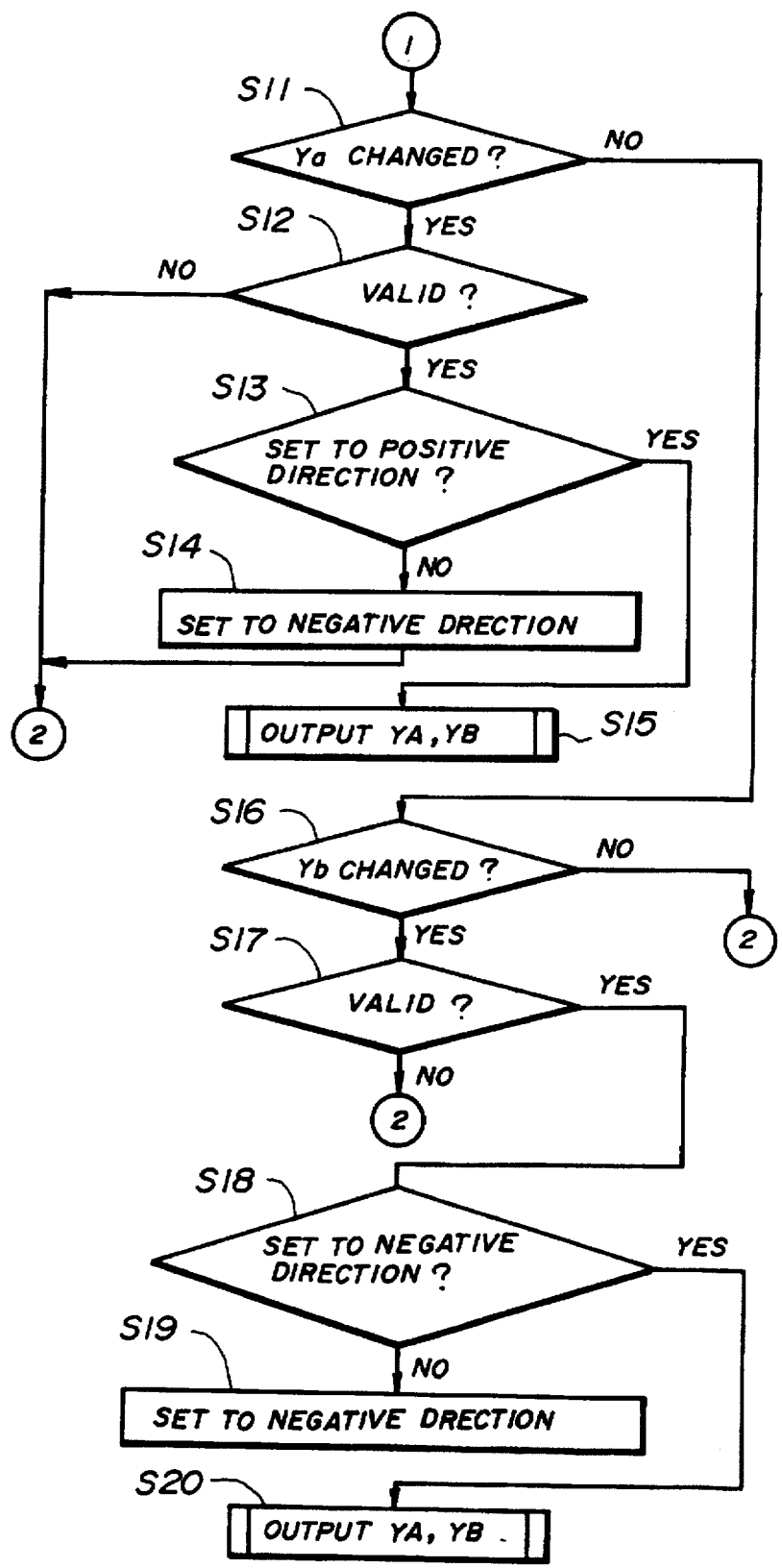
FIG. 39 is a flow chart for explaining the operation of generating output signals of the MPU.
Figure 40:
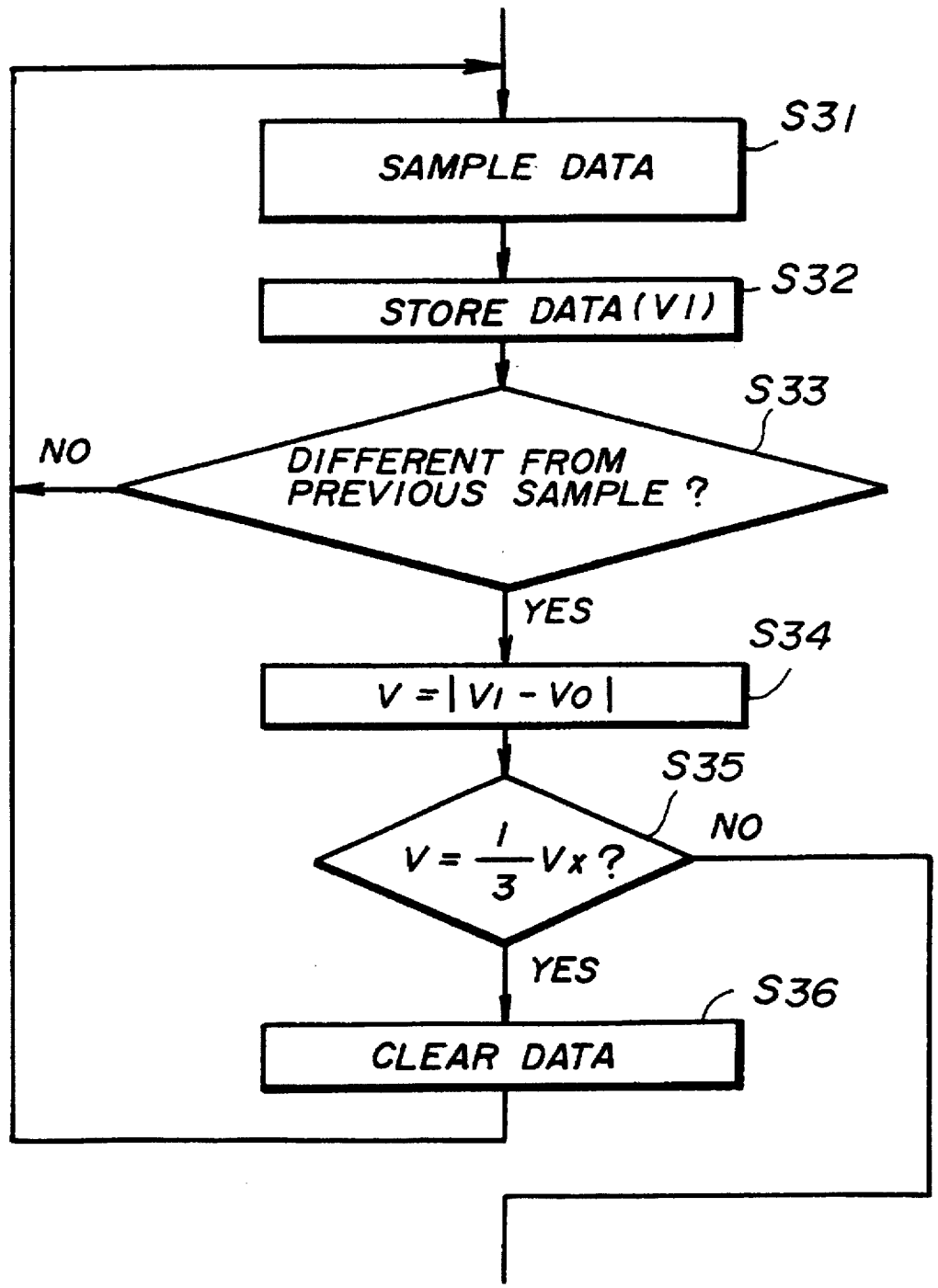
FIG. 40 is a flow chart showing a part of the flow chart shown in FIG. 38 in more detail.
Figure 41:
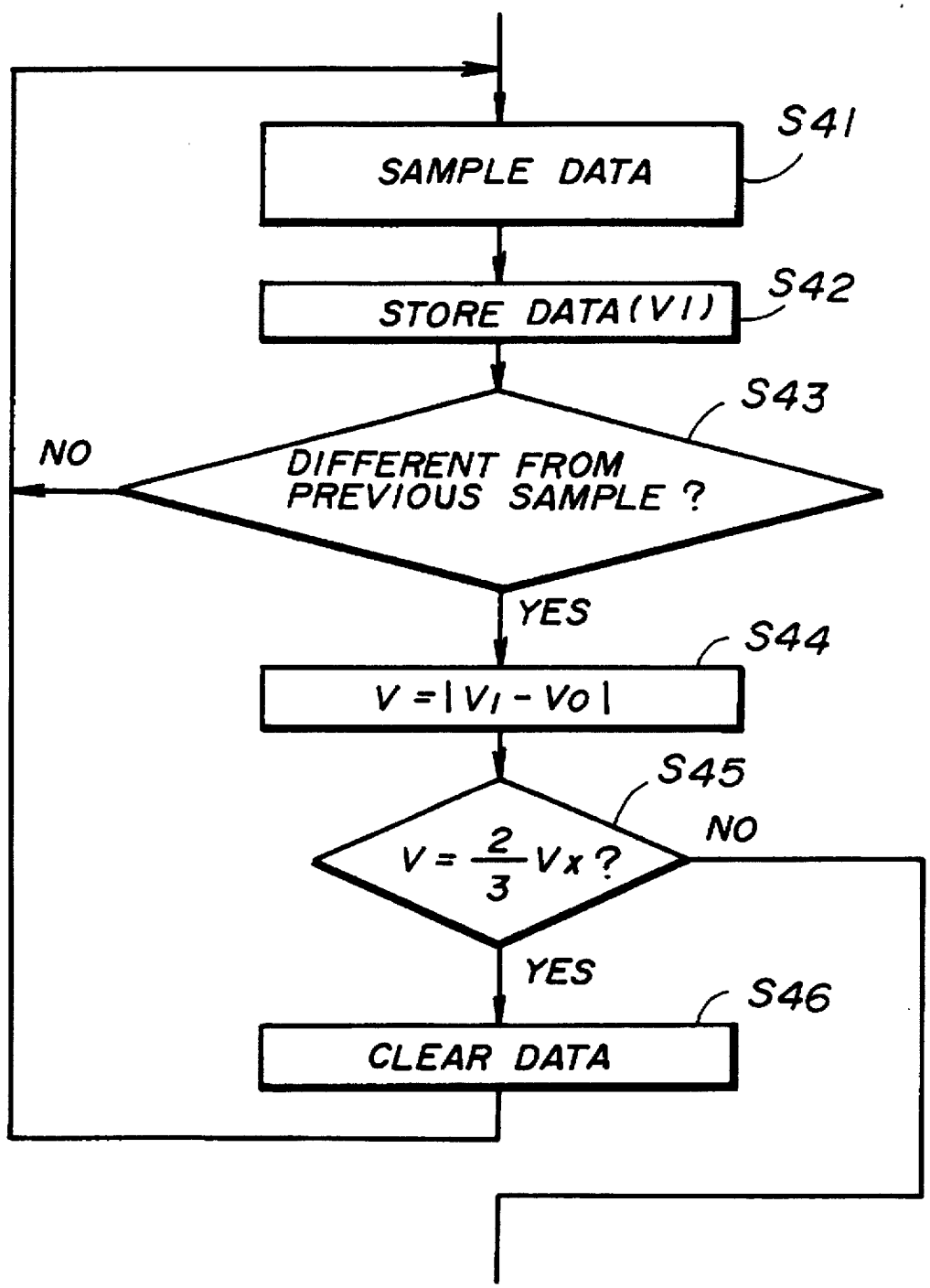
FIG. 41 is a flow chart showing a part of the flow chart shown in FIG. 39 in more detail.

In FIG. 18, when the coordinate input part 2 is moved from the predetermined position in an arbitrary direction other than the 45° direction, the output signals Xa, Xb, Ya and Yb of the detectors 31a, 31b, 32a and 32b input to the MPU 36 are converted into the digital output signals X'a, X'b, Y'a and Y'b within the MPU 36. These digital output signals X'a, X'b, Y'a and Y'b undergo the transitions described above in conjunction with FIG. 22. Hence, the output signals XA, XB, YA and YB of the MPU 36 undergo transitions shown in FIG. 37 in response to the transitions of the output signals Xa, Xb, Ya and Yb. In this case, the output signals XA, XB, YA and YB of the MPU 36 indicate the moving direction and the moving quantity of the coordinate input part 2 with respect to the x-axis and the y-axis. FIGS. 38 and 39 are flow charts for explaining the operation of the MPU 36 when generating the output signals XA, XB, YA and YB. FIG. 40 is a flow chart showing a part of FIG. 38 in more detail. FIG. 41 is a flow chart showing a part of FIG. 39 in more detail.

Figure 42:
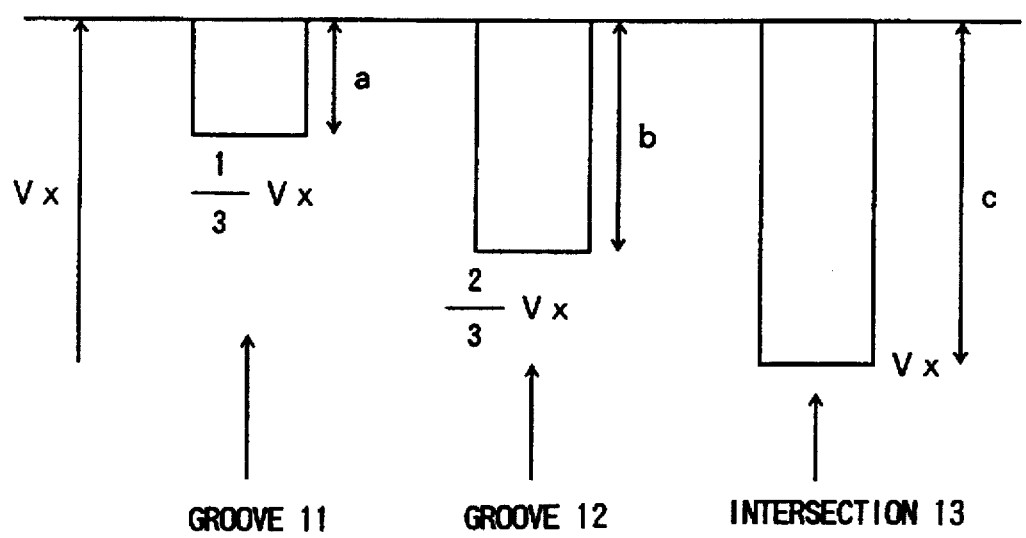
FIG. 42 is a diagram for explaining the relationship of the depths of the grooves and intersections.

For the sake of convenience, it will be assumed that the relationship shown in FIG. 42 stands among the output voltages of the detectors 31a, 31b, 32a and 32b when the grooves 11 and 12 and the intersections are detected. In other words, the detectors 31a, 31b, 32a and 32b output an output voltage Vx when the intersection 13 having the depth c is detected, output an output voltage (2/3)Vx when the groove 12 having the depth b is detected, and output an output voltage (1/3)Vx when the groove having the depth a is detected.

First, in FIG. 38, a step S1 decides whether or not the output voltage Xa of the detector 31a changed, and the process advances to a step S6 which will be described later if the decision result in the step S1 is NO. On the other hand, if the decision result in the step S1 is YES, a step S2 decides whether or not the output voltage Xa is a valid data.

FIG. 40 shows the steps S1 and S2 in more detail. In FIG. 40, a step S31 samples the output voltage Xa via an A/D conversion port of the MPU 36 supplied with the output voltage Xa of the detector 31a. A step S32 stores, as a voltage V1, the sampled data within the MPU 38 or in an external memory circuit (not shown). A step S33 decides whether or not a voltage V0 stored during the previous sampling differs from the voltage V1 stored during the present sampling, and the process returns to the step S31 if the decision result in the step S33 is NO. On the other hand, if the decision result in the step S33 is YES, a step S34 sets V to V=|V1−V0|. A step S35 decides whether or not V=(1/3)Vx, and if the decision result in the step S35 is YES, a step S36 clears the stored data before the process returns to the step S31. If the decision result in the step S35 is NO, the sampled data is regarded as being valid, and the process advances to a step S3 shown in FIG. 38.

The step S3 shown in FIG. 38 decides whether or not the moving direction of the coordinate input part 2 is the direction +x based on the phase relationship of the output voltages Xa and Xb of the detectors 31a and 31b. If the decision result in the step S3 is NO, a step S4 regards that the moving direction is the direction −x, and the process returns to the step S1. On the other hand, if the decision result in the step S3 is YES, a step S5 outputs from the MPU 36 the output signals XA and XB indicating the movement in the direction +x.

A step S6 decides whether or not the output voltage Xb of the detector 31b changed, and the process advances to a step S11 shown in FIG. 39 which will be described later if the decision result in the step S6 is NO. If the decision result in the step S6 is YES, a step S7 decides whether or not the output voltage Xb is a valid data. The step S7 can discriminate the validity of the data by a process similar to that shown in FIG. 40.

A step S8 decides whether or not the moving direction of the coordinate input part 2 is the direction −x based on the phase relationship of the output voltages Xa and Xb of the detectors 31a and 31b. If the decision result in the step S8 is NO, a step S9 regards that the moving direction is the direction +x, and the process returns to the step S1. On the other hand, if the decision result in the step S8 is YES, a step S10 outputs from the MPU 36 the output signals XA and XB indicating the movement in the direction In FIG. 39, the step S11 decides whether or not the output voltage Ya of the detector 32a changed, and the process advances to a step S16 which will be described later if the decision result in the step S11 is NO. If the decision result in the step S11 is YES, a step S12 decides whether or not the output voltage Ya is a valid data.

FIG. 41 shows the steps S11 and S12 in more detail. In FIG. 41, a step S41 samples the output voltage Ya via an A/D conversion port of the MPU supplied with the output voltage Ya of the detector 32a. A step S42 stores, as a voltage V1, the sampled data within the MPU 36 or in an external memory circuit (not shown). A step S43 decides whether or not a voltaMe V0 stored during the previous sampling differs from the voltaMe V1 stored during the present sampling, and the process returns to the step S41 if the decision result in the step S43 is NO. On the other hand, if the decision result in the step S43 is YES, a step S44 sets V to V=|V1−V0|. A step S45 decides whether or not V=(2/3)Vx, and if the decision result in the step S45 is YES, a step S46 clears the stored data before the process returns to the step S41. If the decision result in the step S45 is NO, the sampled data is regarded as being valid, and the process advances to a step S13 shown in FIG. 39.

The step S13 shown in FIG. 39 decides whether or not the moving direction of the coordinate input part 2 is the direction +y based on the phase relationship of the output voltages Ya and Yb of the detectors 32a and 32b. If the decision result in the step S13 is NO, a step S14 regards that the moving direction is the direction −y, and the process returns to the step S11. On the other hand, if the decision result in the step S13 is YES, a step S15 outputs from the MPU 36 the output signals YA and YB indicating the movement in the direction +y.

A step S16 decides whether or not the output voltage Yb of the detector 32b changed, and the process returns to the step S1 shown in FIG. 38 if the decision result in the step S16 is NO. If the decision result in the step S16 is YES, a step S17 decides whether or not the output voltage Yb is a valid data. The step S17 can discriminate the validity of the data by a process similar to that shown in FIG. 41.

A step S18 decides whether or not the moving direction of the coordinate input part 2 is the direction −y based on the phase relationship of the output voltages Ya and Yb of the detectors 32a and 32b. If the decision result in the step S18 is NO, a step S19 regards that the moving direction is the direction +y. On the other hand, if the decision result in the step S18 is YES, a step S20 outputs from the MPU 36 the output signals YA and YB indicating the movement in the direction −y.

Next, a description will be given of a second embodiment of the pointing device according to the present invention, by referring to FIGS. 43 and 44.

Figure 43:
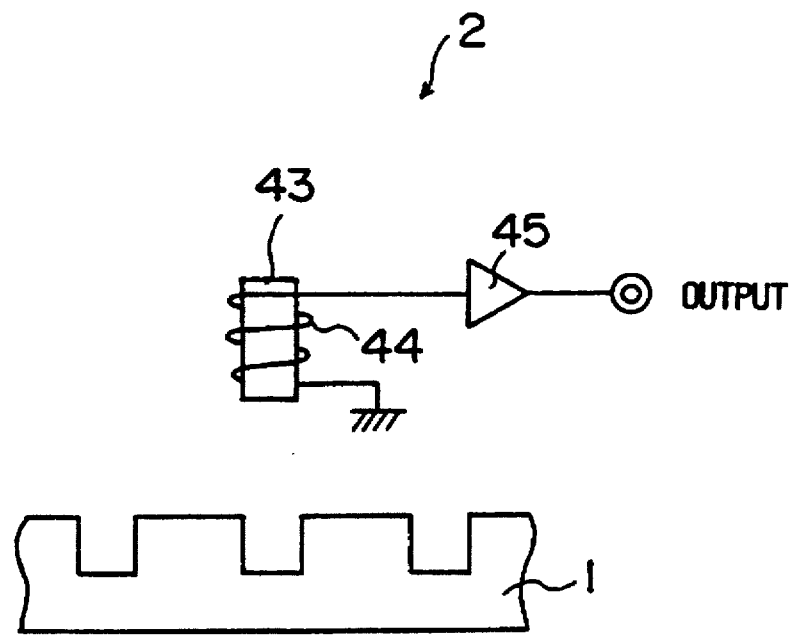
FIG. 43 is a diagram showing a part of a second embodiment of the pointing device according to the present invention.
Figure 44:
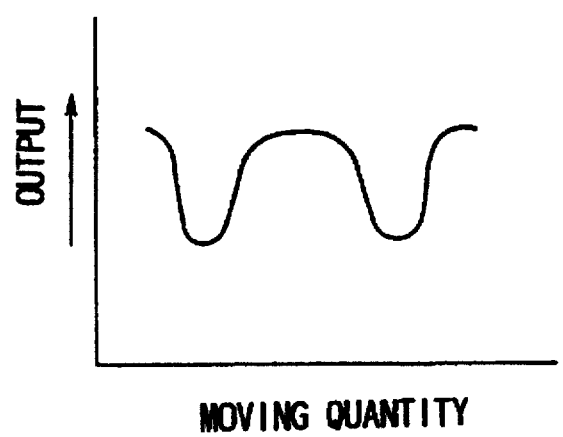
FIG. 44 is a diagram showing the relationship between the moving quantity of the coordinate input part and the output of the detector.

FIG. 43 shows a part of the second embodiment with a plate shown in cross section. In FIG. 43, the metal detection plate 1 is made of a magnetic material such as FeCoNi, similarly to the first embodiment. A plurality of parallel grooves, respectively parallel to the x-axis and the y-axis, are provided on the surface of the plate 1 in the form of a checker board. On the other hand, the coordinate input part 2 has a detector which generally includes a permanent magnet 43, a coil 44 wound around the permanent magnet 43, and an amplifier 45. One end of the coil 44 is grounded, while the other end of the coil 44 is connected to the amplifier 45.

When one end of the coil 44 is moved on the plate 1, the magnetic field from the permanent magnet 43 reaches the coil 44 via the plate 1, thereby generating an electromotive force. This electromotive force is output via the amplifier 45. Since the plate 1 is provided with the plurality of grooves, one end of the coil 44 alternately passes over the groove portion and the non-groove portion of the plate 1 as the coordinate input part 2 moves on the plate 1. Accordingly, the output signal of the amplifier 45 changes as shown in FIG. 44 depending on the moving quantity of the coordinate input part 2. This embodiment employs a kind of electromotive force system which detects the moving direction and the moving quantity of the coordinate input part 2 with respect to the plate 1 using the output change of the amplifier 45.

The construction of the plate 1, the construction of the casing of the coordinate input part 2, and the method of detecting the moving direction and the moving quantity of the coordinate input part 2 based on the outputs of the detectors can respectively be similar to those of the first embodiment described above, and illustration and description thereof will be omitted.

Next, a description will be given of a third embodiment of the pointing device according to the present invention, by referring to FIGS. 45 and 46.

Figure 45:
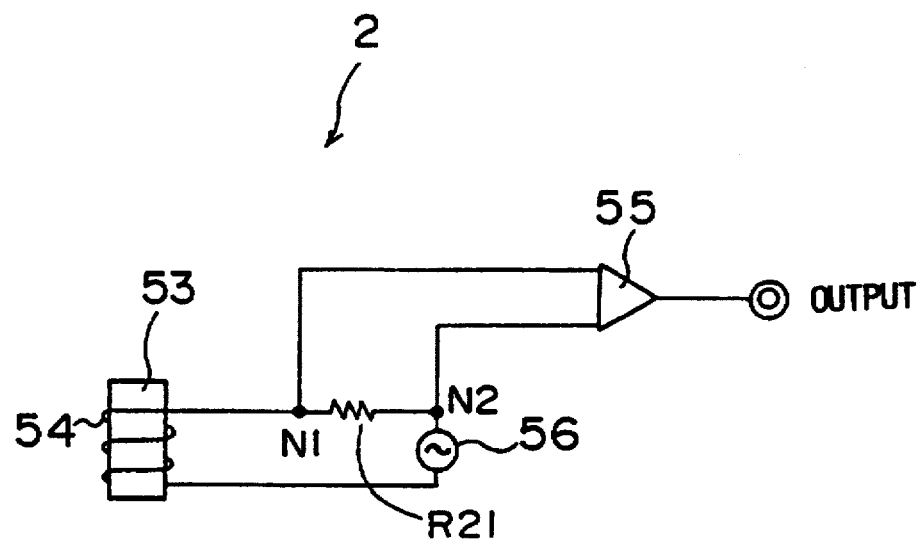
FIG. 45 is a diagram showing a part of a third embodiment of the pointing device according to the present invention.
Figure 46:
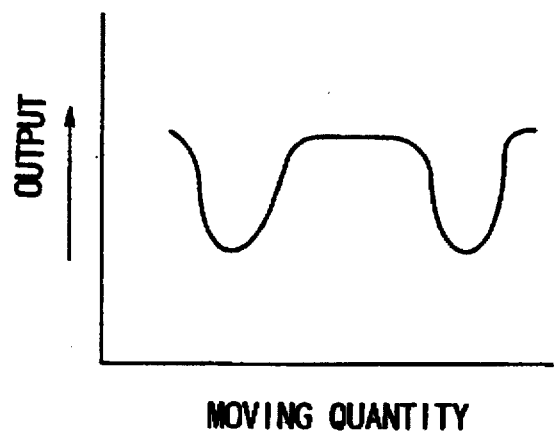
FIG. 46 is a diagram showing the relationship between the moving quantity of the coordinate input part and the output of the detector.

FIG. 45 shows a part of the third embodiment with a plate shown in cross section. In FIG. 45, the metal detection plate 1 is made of a magnetic material such as FeCoNi, similarly to the first embodiment. A plurality of parallel grooves, respectively parallel to the x-axis and the y-axis, are provided on the surface of the plate 1 in the form of a checker board. On the other hand, the coordinate input part 2 has a detector which generally includes an iron core 53, a coil 54 wound around the iron core 53, an amplifier 55, a detection resistor R21, and an A.C. power supply 56. One end of the coil 54 is connected to one end of the A.C. power supply 56, and the other end of the coil 54 is connected to one input of the amplifier 55 and to one end of the resistor R21 via a node N1. The node N1 is connected to a node N2 via the resistor R21. This node N2 connects the other input of the amplifier 55 and the other end of the A.C. power supply 56.

When the A.C. voltage from the A.C. power supply 56 is applied to the coil 54 via the resistor R21 and the coil 54 is moved on the plate 1, the magnetic field from a magnet which is formed by the iron core 53 and the coil 54 reaches the coil 54 via the plate 1. As a result, the inductance component of the coil 54 changes, and the terminal voltage of the resistor R21 changes. The terminal voltage of the resistor R21 is output via the amplifier 55. Since a plurality of parallel grooves, respectively parallel to the x-axis and the y-axis, are provided on the plate 1, one end of the coil 54 alternately passes over the groove portion and the non-groove portion of the plate 1 as the coordinate input part 2 moves on the plate 1. Accordingly, the output signal of the amplifier 55 changes as shown in FIG. 46 depending on the moving quantity of the coordinate input part 2. This embodiment employs a kind of electromagnetic induction system which detects the moving direction and the moving quantity of the coordinate input part 2 with respect to the plate 1 using the output change of the amplifier 55.

The construction of the plate 1, the construction of the casing of the coordinate input part 2, and the method of detecting the moving direction and the moving quantity of the coordinate input part 2 based on the outputs of the detectors can respectively be similar to those of the first embodiment described above, and illustration and description thereof will be omitted.

In the first through third embodiments described above, the moving direction and the moving quantity of the coordinate input part are detected by detecting the change in the magnetic flux or the magnetic field, and there is no need to make a detection using a mechanical part such as a ball. For this reason, the deterioration in the detection accuracy caused by the frictional wear of the mechanical parts will not occur in these embodiments. In these embodiments, it is possible to maintain the high detection accuracy without having to make the periodic maintenance that was otherwise necessary in the conventional case to remove the dust particles and the like. In addition, since these embodiments do not use a photocoupler, it is possible to avoid the deterioration in the detection accuracy that was conventionally caused by the deterioration of the photocoupler itself with time (age). Therefore, the first through third embodiments virtually do not require maintenance, and it is possible to always input the coordinates with a high and stable accuracy regardless of the age of the pointing device.

Next, a description will be given of a fourth embodiment of the pointing device according to the present invention, by referring to FIGS. 47 through 71.

Figure 47:
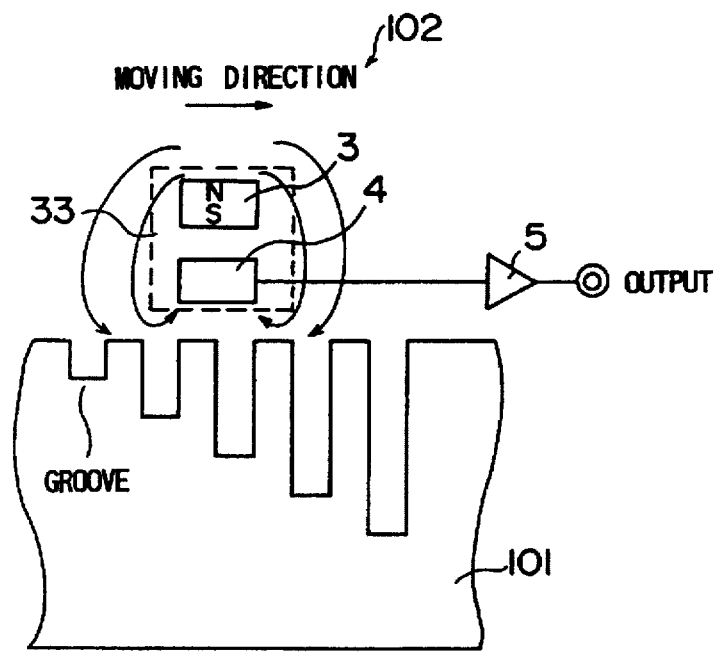
FIG. 47 is a diagram showing a part of a fourth embodiment of the pointing device according to the present invention.

FIG. 47 shows a part of the fourth embodiment with a plate shown in cross section. In FIG. 47, a metal detection plate 101 is made of a magnetic material such as FeCoNi, similarly to the plate 1 of the first embodiment. A plurality of parallel grooves, respectively parallel to the x-axis and the y-axis, are provided on the surface of the plate 101 in the form of a checker board. On the other hand, a coordinate input part 102 has a detector 33 generally including a permanent magnet 3, a Hall element 4 and an amplifier 5.

Figure 48:
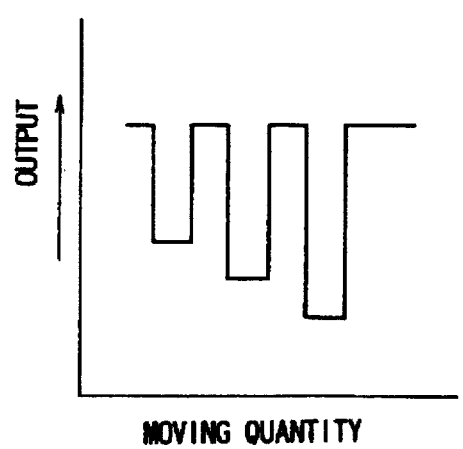
FIG. 48 is a diagram showing the relationship between the moving quantity of the coordinate input part and the output of the detector.

As shown in FIG. 47, the magnetic flux from the permanent magnet 3 is fed back to the permanent magnet 3 via the plate 101. Since the Hall element 4 is positioned between the permanent magnet 3 and the plate 101, it is possible to efficiently recognize the magnetic flux that is fed back to the permanent magnet 3 via the plate 101. The plate 101 is provided with the plurality of grooves, and thus, when the coordinate input part 102 moves on the plate 101, the magnetic flux from the permanent magnet 3 alternately passes through the groove portion and the non-groove portion of the plate 101. In addition, the grooves of the plate 101 have depths which become greater towards a predetermined direction, that is, towards the right as shown in FIG. 47, for example. Accordingly, the output signal of the amplifier 5 which receives the output signal of the Hall element 4 changes depending on the moving quantity or the moving distance of the coordinate input part 102 as shown in FIG. 48. FIG. 48 shows the output signal of the amplifier 5 for a case where the coordinate input part 102 is moved to the right in FIG. 47. In this embodiment, the moving direction and the moving quantity of the coordinate input part 102 with respect to the plate 101 are detected using the output change of the amplifier 5.

Figure 49A:
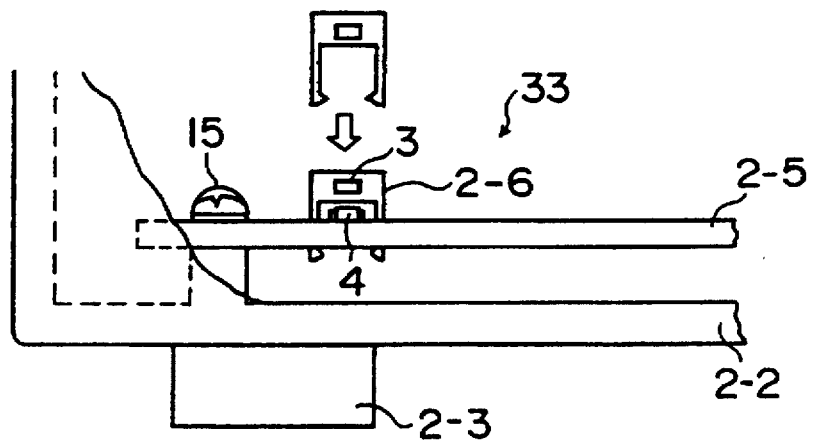
FIGS. 49A and 49B respectively are diagrams showing an embodiment of the construction of the detector.
Figure 49B:
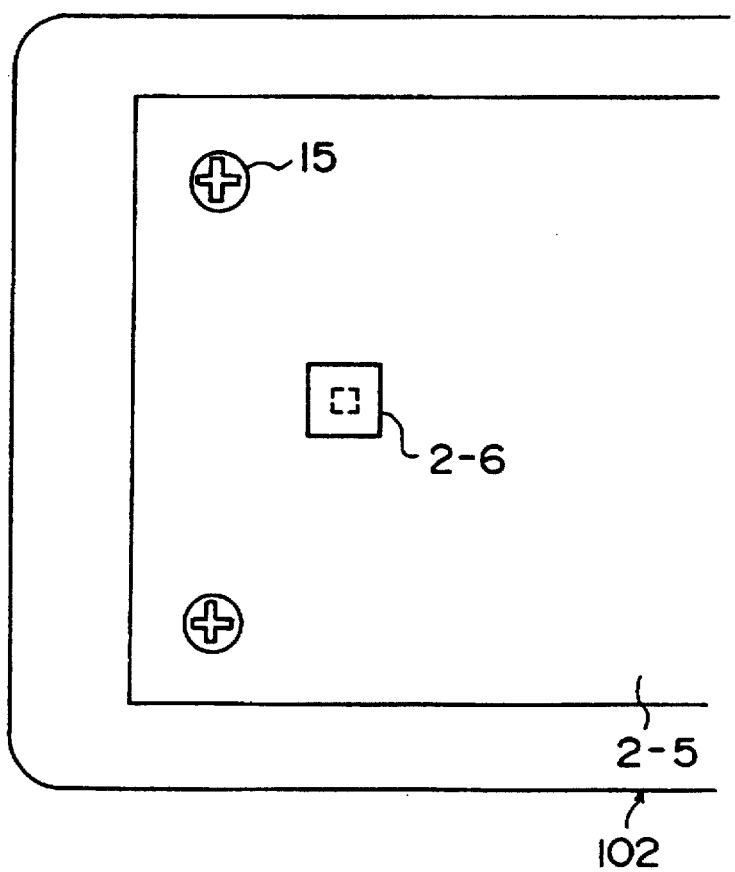

FIGS. 49A and 49B respectively are diagrams showing an embodiment of the construction of the detector 33. FIG. 49A shows a partial cross section of the coordinate input part 102, and FIG. 49B shows a plan view of the inside of the coordinate input part 102 with the top cover 2-1 removed. As shown in FIGS. 49A and 49B, a single magnet holder 2-6 is plugged into a printed circuit board 2-5. The magnet holder 2-6 holds the permanent magnet 3 and the Hall element 4 with a predetermined positional relationship. Circuits such as the amplifier 5 shown in FIG. 47 are formed on the printed cand the oard 2-5, and the above described detector 33 is formed by the magnet holder 2-6 and the circuits provided on the printed circuit board 2-5. As shown in FIGS. 49A and 49B, the printed circuit board 2-5 is mounted on the bottom cover 2-2 by screws 15.

Figure 50:
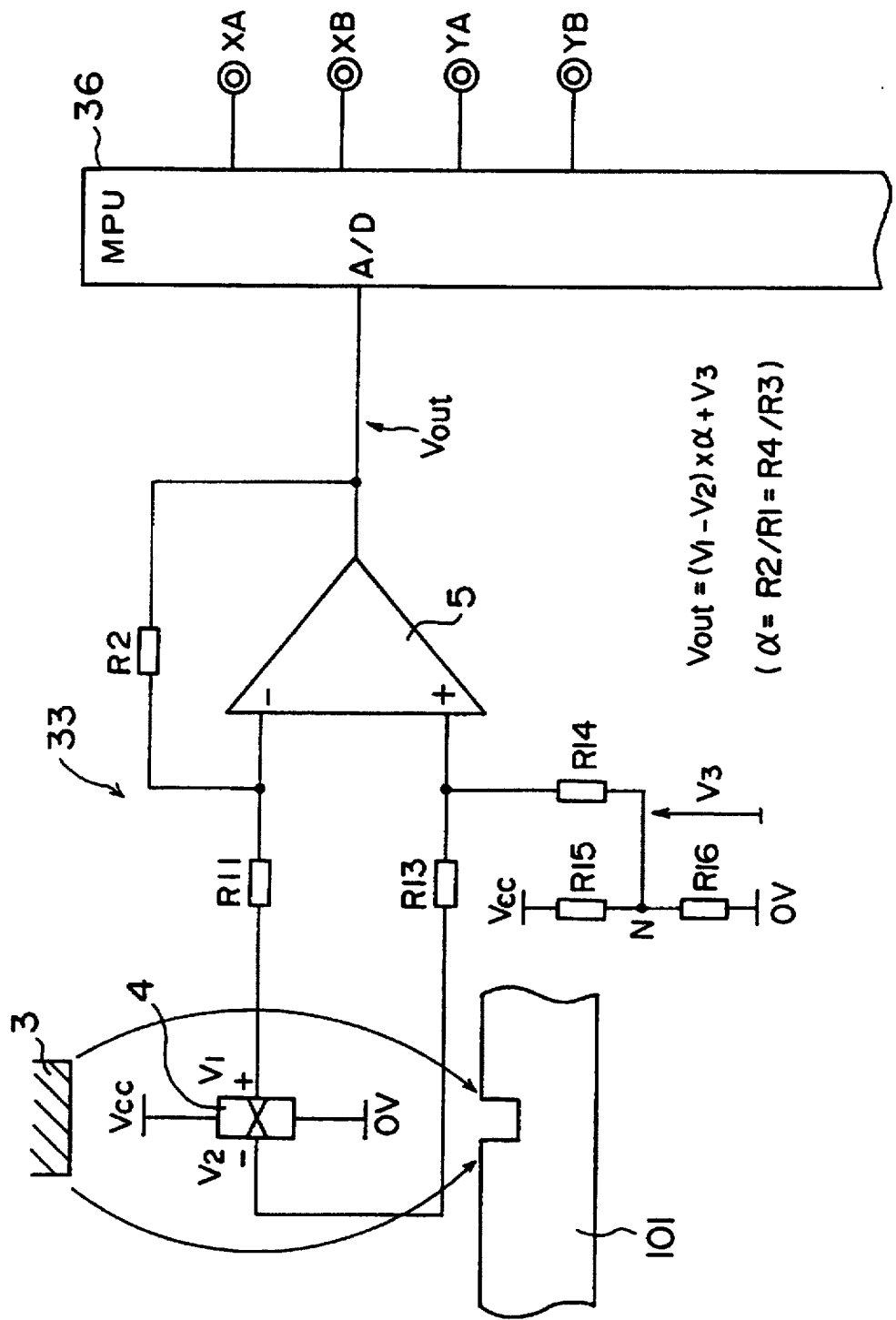
FIG. 50 is a circuit diagram showing the construction of the detector.

Next, a more detailed description will be given of the construction of the detector 33, by referring to FIG. 50. In FIG. 50, those parts which are the same as those corresponding parts in FIGS. 16, 17 and 47 are designated by the same reference numerals, and a description thereof will be omitted.

In FIG. 50, an output voltage Vout of the amplifier 5 described by Vout=(V1−V2)·α+V3 is supplied to the A/D conversion port of the MPU 36, where V3 denotes the potential between the node N and the ground, α=R2/R1= R4/R3, and R1 through R4 respectively denote the resistances of the resistors R11 through R14. The MPU 36 outputs the output signals XA, XB, YA and YB that indicate the moving direction and the moving quantity of the coordinate input part 102 on the plate 101, based on the output voltage Vout.

Figure 51:
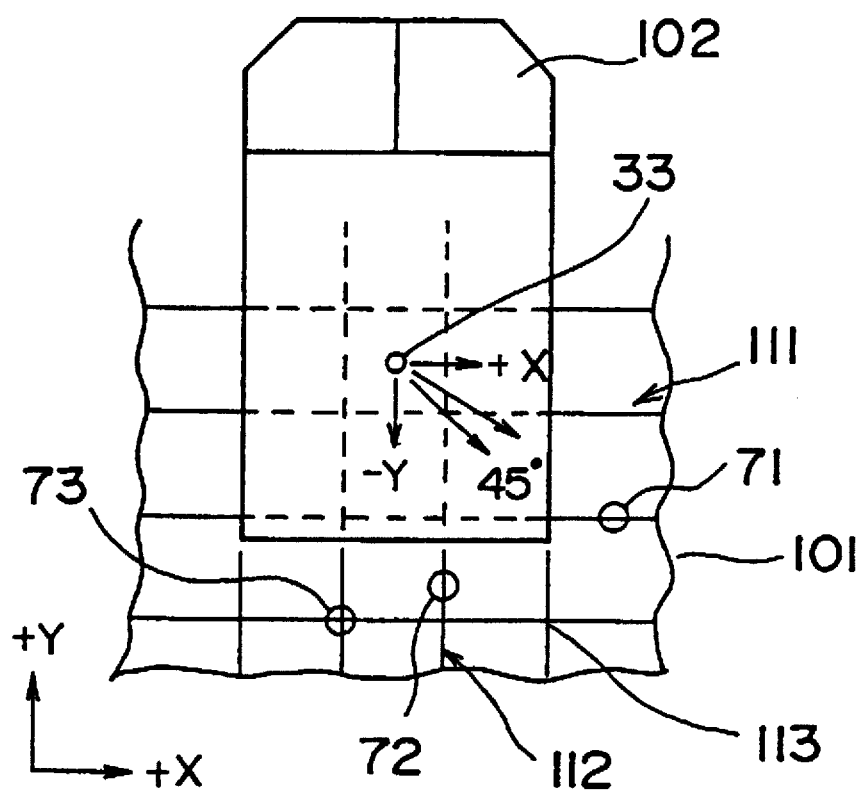
FIG. 51 is a plan view showing the coordinate input part located at a predetermined position on the plate.

FIG. 51 is a plan view showing a state where the coordinate input part 102 is located at a predetermined position on the plate 101. Grooves 111 for detecting the movement in the direction y, and grooves 112 for detecting the movement in the direction x are perpendicular to each other and are formed on the plate 101. The grooves 111 are provided at constant intervals and are parallel to the x-axis, while the grooves are provided at constant intervals and are parallel to the y-axis. The groove 111 and the groove 112 intersect at an intersection 113.

Figure 52:
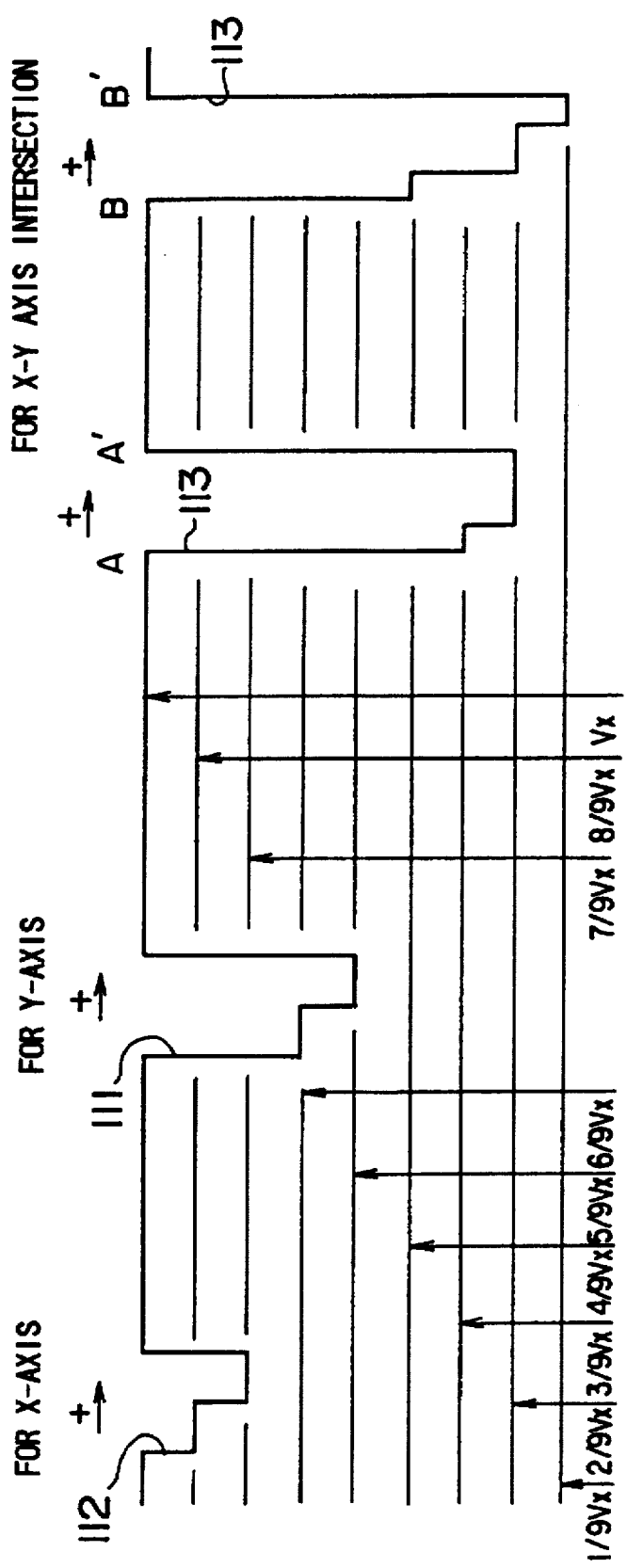
FIG. 52 is a cross sectional view showing the cross sections at various portions of the plate shown in FIG. 51.

FIG. 52 shows a cross section of the groove along the direction +y at a portion 71 shown in FIG. 51, a cross section of the groove 112 along the direction +x at a portion 72 shown in FIG. 51, and cross sections of the intersection 113 respectively along the directions +x and +y at a portion 73 shown in FIG. 51. FIG. 53 is a plan view, on an enlarged scale, showing the portion 73 shown in FIG. 51. The cross sections of the intersection 113 along lines A–A' and B–B' shown in FIG. 52 respectively are the cross sections taken along the lines A-A' and B-B' in FIG. 53. In this embodiment, the depth of the groove 111 and the depth of the groove 112 differ, and the depth of each groove 111 increases towards the direction +y while the depth of each groove 112 increases towards the direction +x. In this embodiment, each of the grooves 111 and 112 have two depths, and the depth of each groove 111 is greater towards the direction +y and the depth of each groove 112 is greater towards the direction +x.

In FIG. 52, Vx through (1/9)Vx indicated on the lower portion of the drawing respectively indicate the values of the output voltage Vout output from the amplifier 5 shown in FIG. 50 depending on the depth of the grooves 111 and 112 and the intersections 113.

Accordingly, the MPU 36 shown in FIG. 50 can detect the moving direction and the moving quantity of the coordinate input part 102 with respect to the plate 101 by detecting the change of the output voltage Vout within a range of Vx to (1/9)Vx.

In other words, the first through third embodiments described above detect the moving direction and the moving quantity of the coordinate input part using a total of four detectors. But in this fourth embodiment, it is possible to detect the moving direction and the moving quantity of the coordinate input part using a single detector.

FIG. 54 shows a discrimination table that is used to discriminate the direction in which the coordinate input part 102 is moving on the plate 101 when the coordinate input part 102 passes the intersection 113 of the plate 101. The MPU 36 discriminates the moving direction of the coordinate input part 102 which passes the intersection 113 by using this discrimination table, and outputs the output signals XA, XB, YA and YB depending on the discrimination result. In FIG. 54, if the output voltage Vout of the amplifier 5 changes from (3/9)Vx to (2/9)Vx, for example, it is discriminated that the coordinate input part 102 is moving in the direction +x. On the other hand, if the output voltage Vout of the amplifier 5 changes from (3/9)Vx to (2/9)Vx and further changes to (1/9)Vx, for example, it is discriminated that the coordinate input part 102 is moving in the directions +x and −y.

Figure 55:
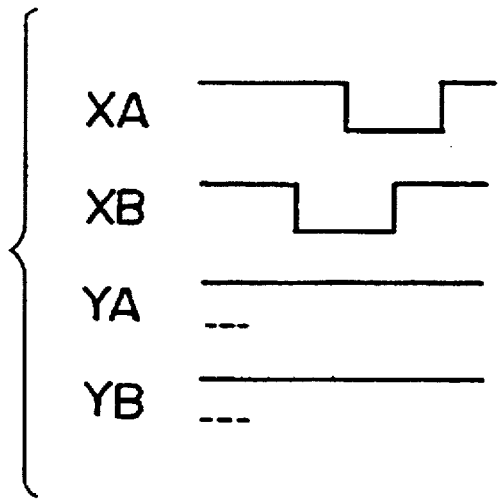
FIG. 55 is a diagram showing output signals of the MPU when it is discriminated that the coordinate input part s moving in the direction +x on the plate.

FIG. 55 is a diagram showing the output signals XA, XB, YA and YB output from the MPU 36 when the MPU 36 discriminates that the coordinate input part 102 is moving in the direction +x on the plate 101 based on the discrimination table shown in FIG. 54.

Figure 56:
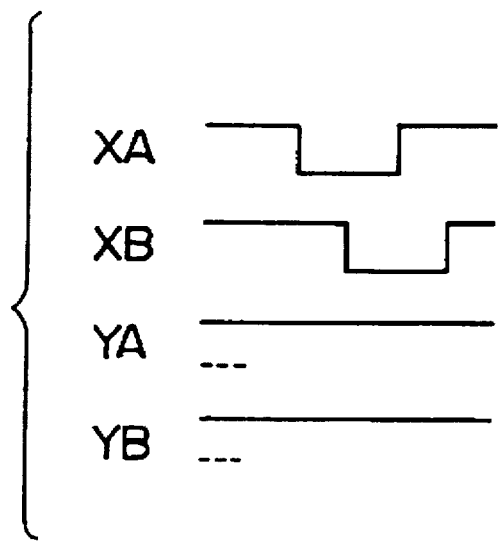
FIG. 56 is a diagram showing the output signals of the MPU when it is discriminated that the coordinate input part is moving in the direction −x on the plate.

FIG. 56 is a diagram showing the output signals XA, XB, YA and YB output from the MPU 36 when the MPU 36 discriminates that the coordinate input part 102 is moving in the direction −x on the plate 101 based on the discrimination table shown in FIG. 54.

Figure 57:
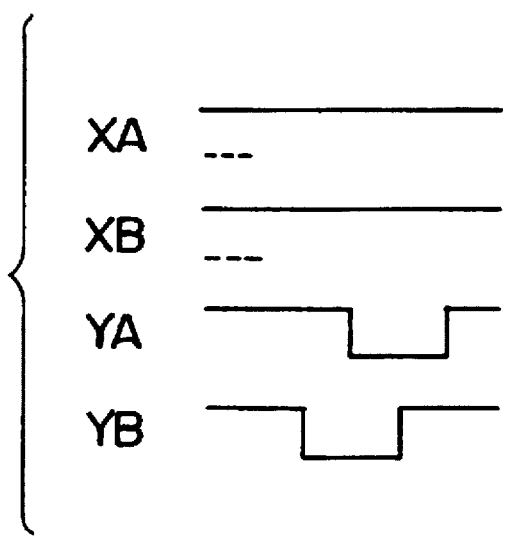
FIG. 57 is a diagram showing output signals of the MPU when it is discriminated that the coordinate input part is moving in the direction +y on the plate.

FIG. 57 is a diagram showing the output signals XA, XB, YA and YB output from the MPU 36 when the MPU 36 discriminates that the coordinate input part 102 is moving in the direction +y on the plate 101 based on the discrimination table shown in FIG. 54.

Figure 58:
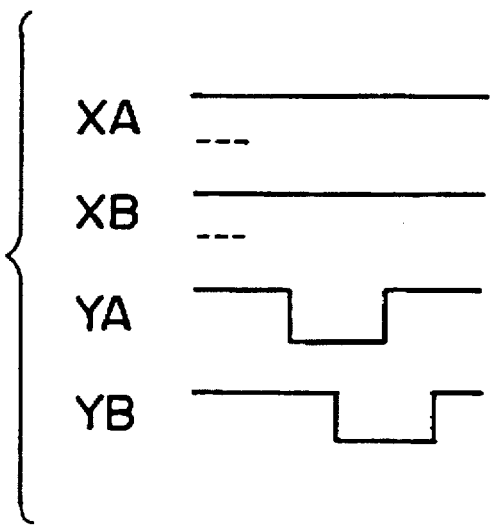
FIG. 58 is a diagram showing the output signals of the MPU when it is discriminated that the coordinate input part is moving in the direction −y on the plate.

FIG. 58 is a diagram showing the output signals XA, XB, YA and YB output from the MPU 36 when the MPU 36 discriminates that the coordinate input part 102 is moving in the direction −y on the plate 101 based on the discrimination table shown in FIG. 54.

Figure 59:
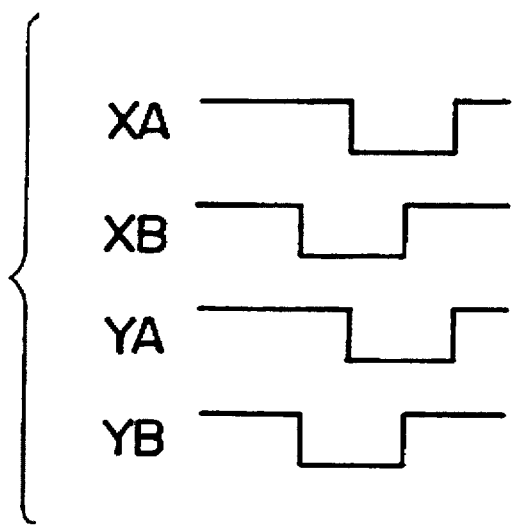
FIG. 59 is a diagram showing output signals of the MPU when it is discriminated that the coordinate input part is moving in the directions +x and +y on the plate.

FIG. 59 is a diagram showing the output signals XA, XB, YA and YB output from the MPU 36 when the MPU 36 discriminates that the coordinate input part 102 is moving in the directions +x and +y on the plate 101 based on the discrimination table shown in FIG. 54.

Figure 60:
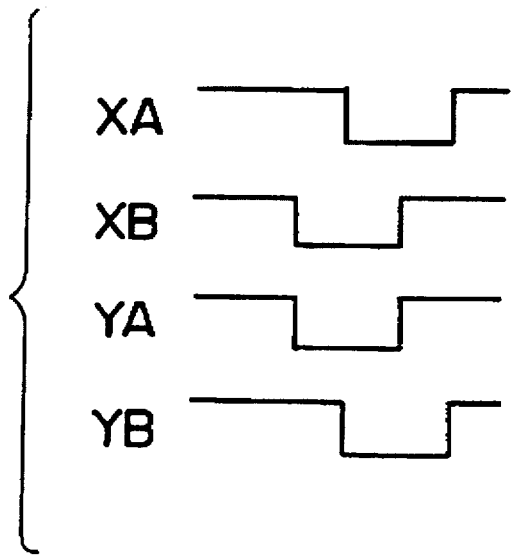
FIG. 60 is a diagram showing the output signals of the MPU when it is discriminated that the coordinate input part is moving in the directions +x and -y on the plate.

FIG. 60 is a diagram showing the output signals XA, XB, YA and YB output from the MPU 36 when the MPU 36 discriminates that the coordinate input part 102 is moving in the directions +x and −y on the plate 101 based on the discrimination table shown in FIG. 54.

Figure 61:
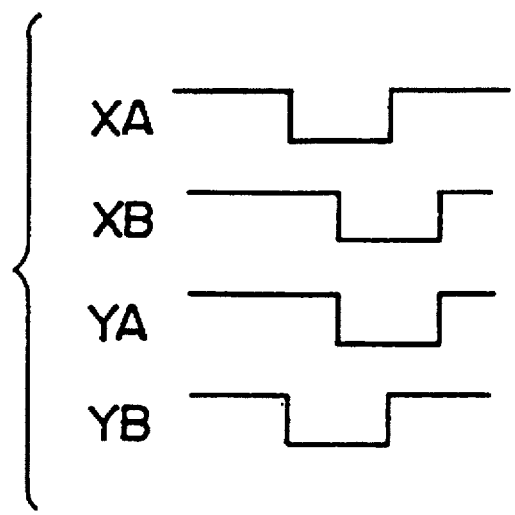
FIG. 61 is a diagram showing output signals of the MPU when it is discriminated that the coordinate input part is moving in the directions -x and +y on the plate.

FIG. 61 is a diagram showing the output signals XA, XB, YA and YB output from the MPU 36 when the MPU 36 discriminates that the coordinate input part 102 is moving in the directions −x and +y on the plate 101 based on the discrimination table shown in FIG. 54.

Figure 62:
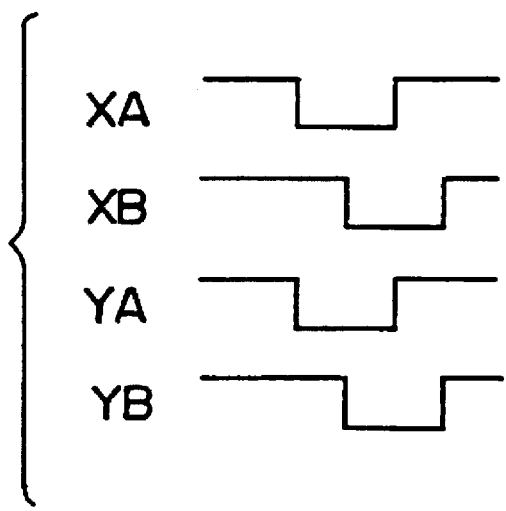
FIG. 62 is a diagram showing the output signals of the MPU when it is discriminated that the coordinate input part is moving in the directions -x and -y on the plate.

FIG. 62 is a diagram showing the output signals XA, XB, YA and YB output from the MPU 36 when the MPU 36 discriminates that the coordinate input part 102 is moving in the directions −x and −y on the plate 101 based on the discrimination table shown in FIG. 54.

FIGS. 63 through 66 respectively are diagrams showing the timings of the output signals XA, XB, YA and YB output from the MPU 36, in correspondence with the detected grooves of the plate 101, as the coordinate input part 102 moves from the predetermined position towards an arbitrary direction in FIG. 51.

Figure 63:
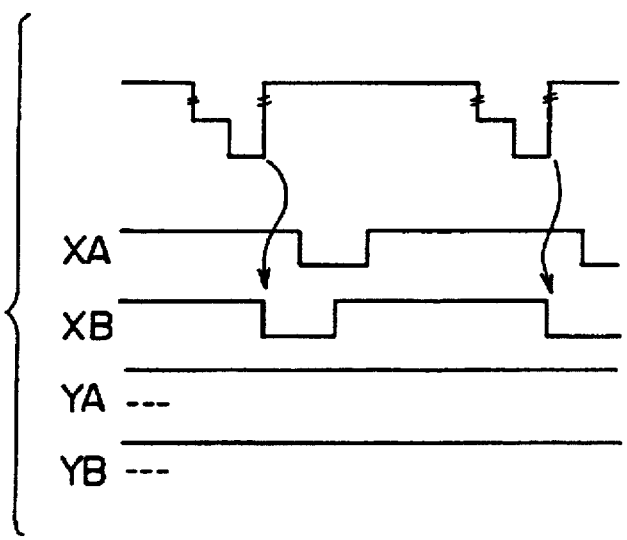
FIG. 63 is a diagram showing the output signals of the MPU in correspondence with detected grooves of the plate when the coordinate input part moves in the direction +x on the plate from the predetermined position.

FIG. 63 shows the timings of the output signals XA, XB, YA and YB output from the MPU 36, in correspondence with the detected grooves of the plate 101, as the coordinate input part 102 moves from the predetermined position in the direction +x in FIG. 51.

Figure 64:
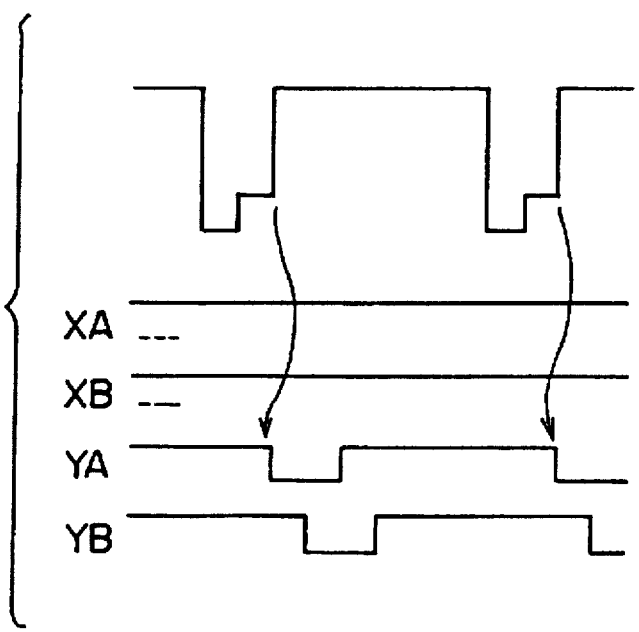
FIG. 64 is a diagram showing the output signals of the MPU in correspondence with the detected grooves of the plate when the coordinate input part moves in the direction -y on the plate from the predetermined position.

FIG. 64 shows the timings of the output signals XA, XB, YA and YB output from the MPU 36, in correspondence with the detected grooves of the plate 101, as the coordinate input part 102 moves from the predetermined position in the direction −y in FIG. 51.

Figure 65:
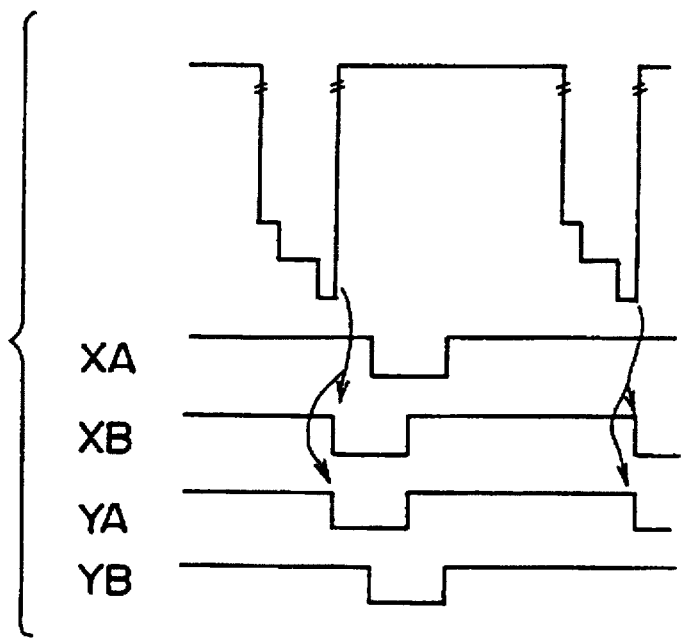
FIG. 65 is a diagram showing the output signals of the MPU in correspondence with the detected grooves of the plate when the coordinate input part moves in the 45° direction on the plate from the predetermined position.

FIG. 65 shows the timings of the output signals XA, XB, YA and YB output from the MPU 36, in correspondence with the detected grooves of the plate 101, as the coordinate input part 102 moves from the predetermined position in a direction inclined by 45° with respect to the direction y in FIG. 51.

Figure 66:
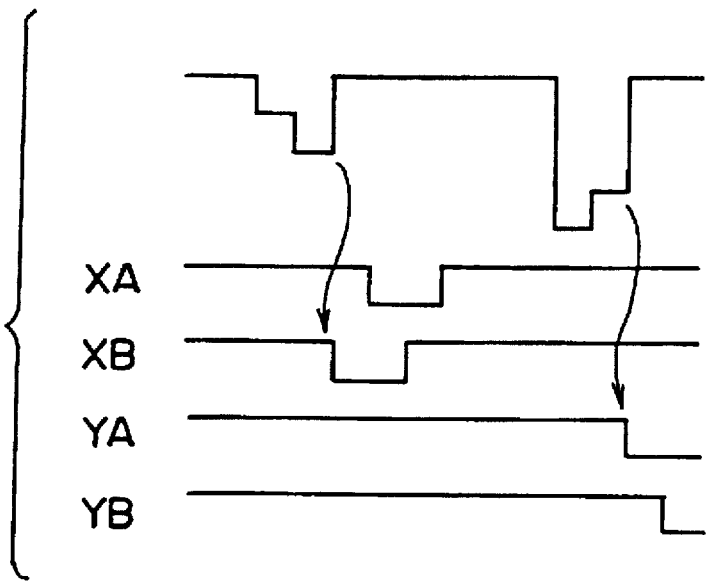
FIG. 66 is a diagram showing the output signals of the MPU in correspondence with the detected grooves of the plate when the coordinate input part moves in the direction other than the 45° direction on the plate from the predetermined position.

FIG. 66 shows the timings of the output signals XA, XB, YA and YB output from the MPU 36, in correspondence with the detected grooves of the plate 101, as the coordinate input part 102 moves from the predetermined position in a direction inclined by an angle other than 45° with respect to the direction y in FIG. 51.

For example, when the coordinate input part 102 moves from the predetermined position on the plate 101 towards the direction +x in FIG. 51, the grooves 112 shown in FIG. 52 are detected. For this reason, the output signal Vout of the amplifier 5 changes from Vx to (8/9)Vx, (7/9)Vx and Vx in this sequence. Hence, by preparing beforehand each combination of the changes in the output signal Vout of the amplifier 5 starting from Vx and returning to Vx, and storing such combinations in the discrimination table shown in FIG. 54, it becomes possible for the MPU 36 to output the output signals XA, XB, YA and YB shown in FIG. 63 by detecting that the coordinate input part 102 is moving in the direction +x when the change from Vx to (8/9)Vx, (7/9)Vx and Vx in this sequence is detected. The discrimination table can be prepare and stored similarly for cases where the coordinate input part 102 moves from the predetermined position on the plate 101 in directions other than the direction +x in FIG. 51.

Figure 67:
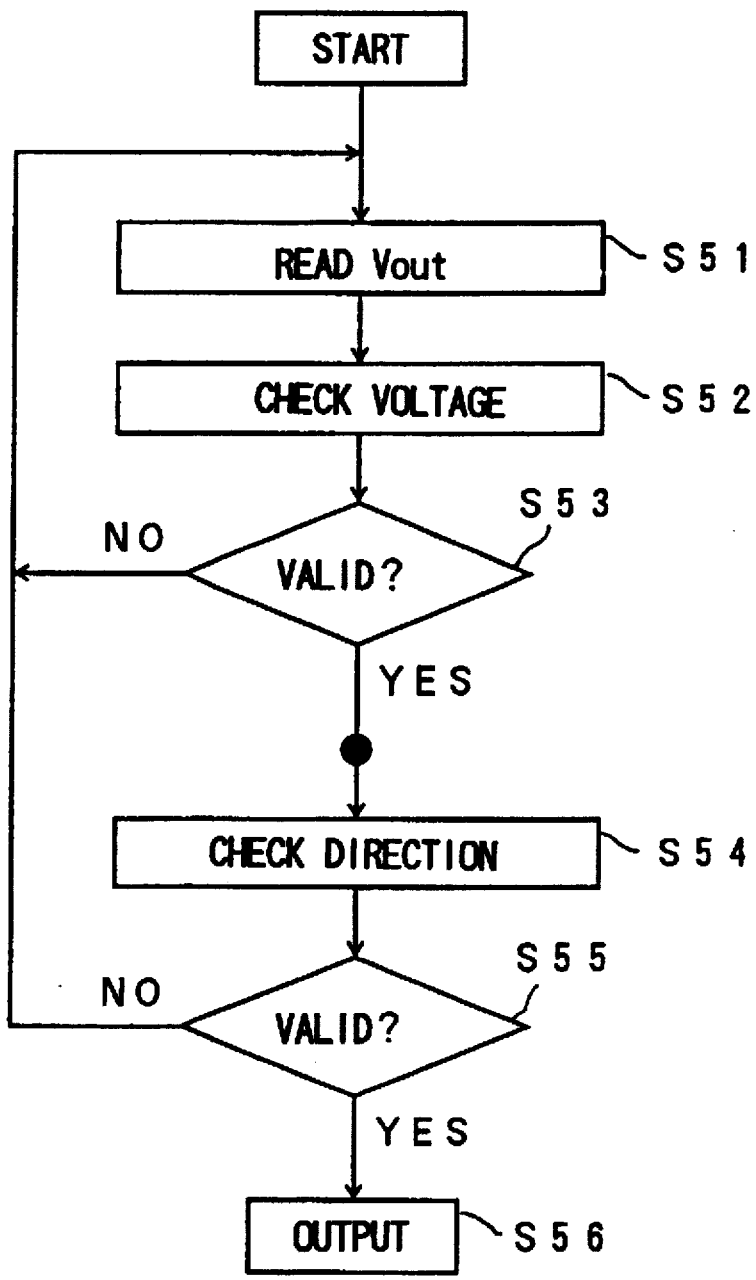
FIG. 67 is a flow chart for explaining basic operations of the MPU.

FIG. 67 is a flow chart for explaining the basic operation of the MPU 36. In FIG. 67, a step S51 reads the output signal Vout of the amplifier 5 that us input to the A/D conversion port of the MPU 36, and a step S52 checks the voltage value of the output signal Vout. A step S53 decides whether or not the input data is valid. In other words, the step S53 decides whether or not the voltage value of the checked output signal Vout falls within a predetermined range of (1/9)Vx to Vx and is valid. The process returns to the step S51 if the decision result in the step S53 is NO.

On the other hand, if the decision result in the step S53 is YES, the A/D converter within the MPU 36 reads the output signal Vout input to the A/D conversion port of the MPU 36 and detects the voltage change thereof as indicated by a black circular mark in FIG. 67, and a step S54 checks the moving direction of the coordinate input part 102 on the plate 101 based on this detected voltage change. A step S55 decides whether or not the detected voltage change is valid. In other words, the step S55 decides whether or not the voltage change can be identified from the discrimination table of the MPU 36. The process returns to the step S51 if the decision result in the step S55 is NO. On the other hand, if the decision result in the step S55 is YES, a step S56 outputs the output signals XA, XB, YA and YB that are generated based on the discrimination table.

FIGS. 68 through 71 respectively are flow charts for explaining the operation of the MPU 36 in more detail. In FIGS. 68 through 71, the black circular mark indicates that the A/D converter within the MPU 36 reads the output signal Vout input to the A/D conversion port of the MPU 36, similarly as described above with reference to FIG. 67.

Figure 68:
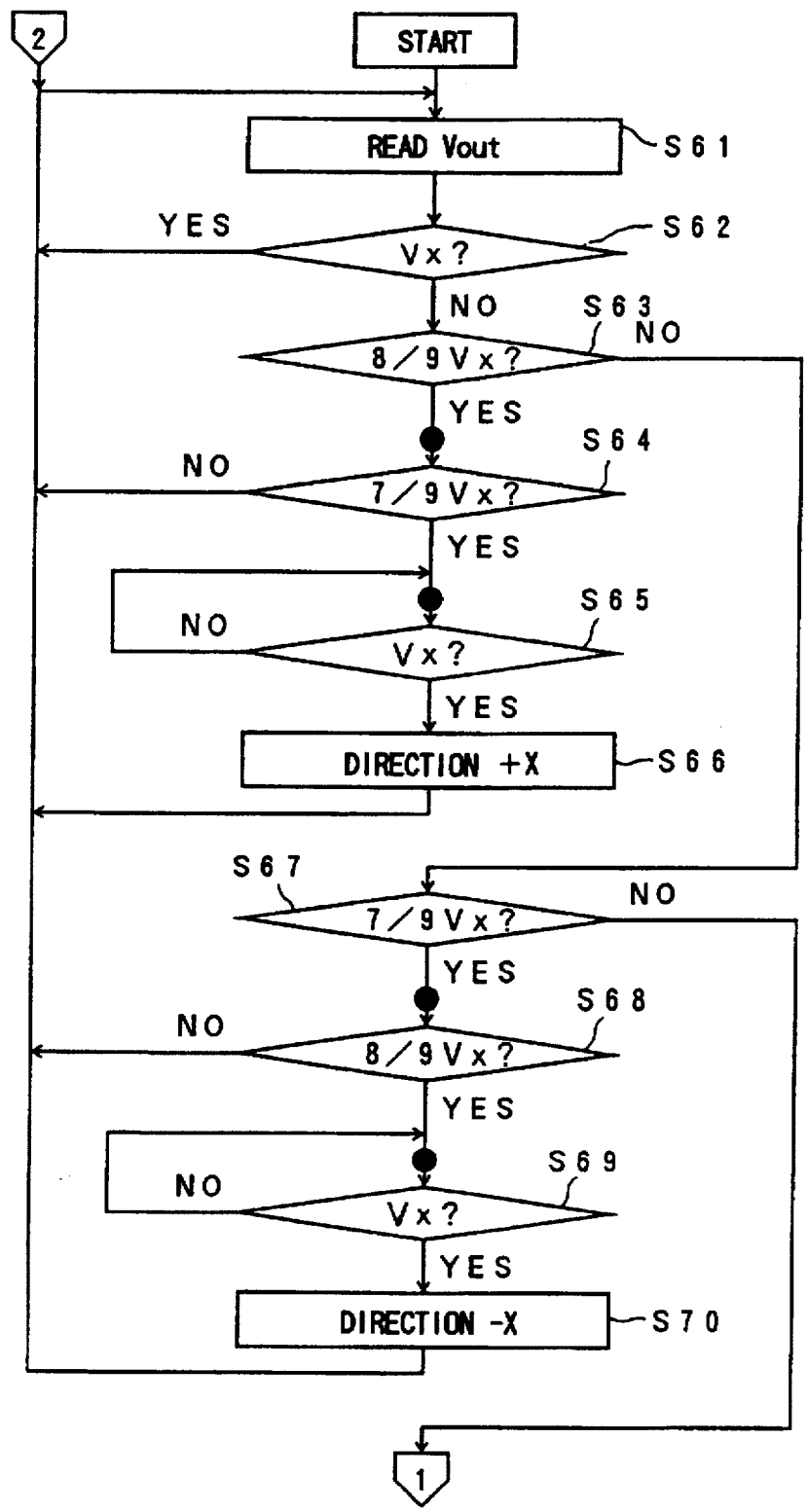
FIG. 68 is a flow chart for explaining the operation of the MPU in more detail.

In FIG. 68, a step S61 reads the output signal Vout of the amplifier 5 that is input to the A/D conversion port of the MPU 36, and a step S62 decides whether or not the voltage value of the output signal Vout is equal to Vx. The process returns to the step S61 if the decision result in the step S67 is YES. On the other hand, if the decision result in the step S62 is NO, a step S63 decides whether oP not the voltage value of the output signal Vout is equal to (8/9)Vx, and the process advances to a step S67 which will be described later if the decision result in the step S63 is NO. If the decision result in the step S63 is YES, the output signal Vout is read, and a step S64 decides whether or not the voltage value of the output signal Vout is equal to (7/9)Vx. The process returns to the step S61 if the decision result in the step S64 is NO. On the other hand, if the decision result in the step S64 is YES, the output signal Vout is read, and a step S65 decides whether or not the voltage value of the output signal Vout is equal to Vx. If the decision result in the step S65 is YES, a step S66 generates and outputs the output signals XA and XB which indicate that the moving direction of the coordinate input part 102 is the direction +x, and the process returns to the step S61.

Figure 69:
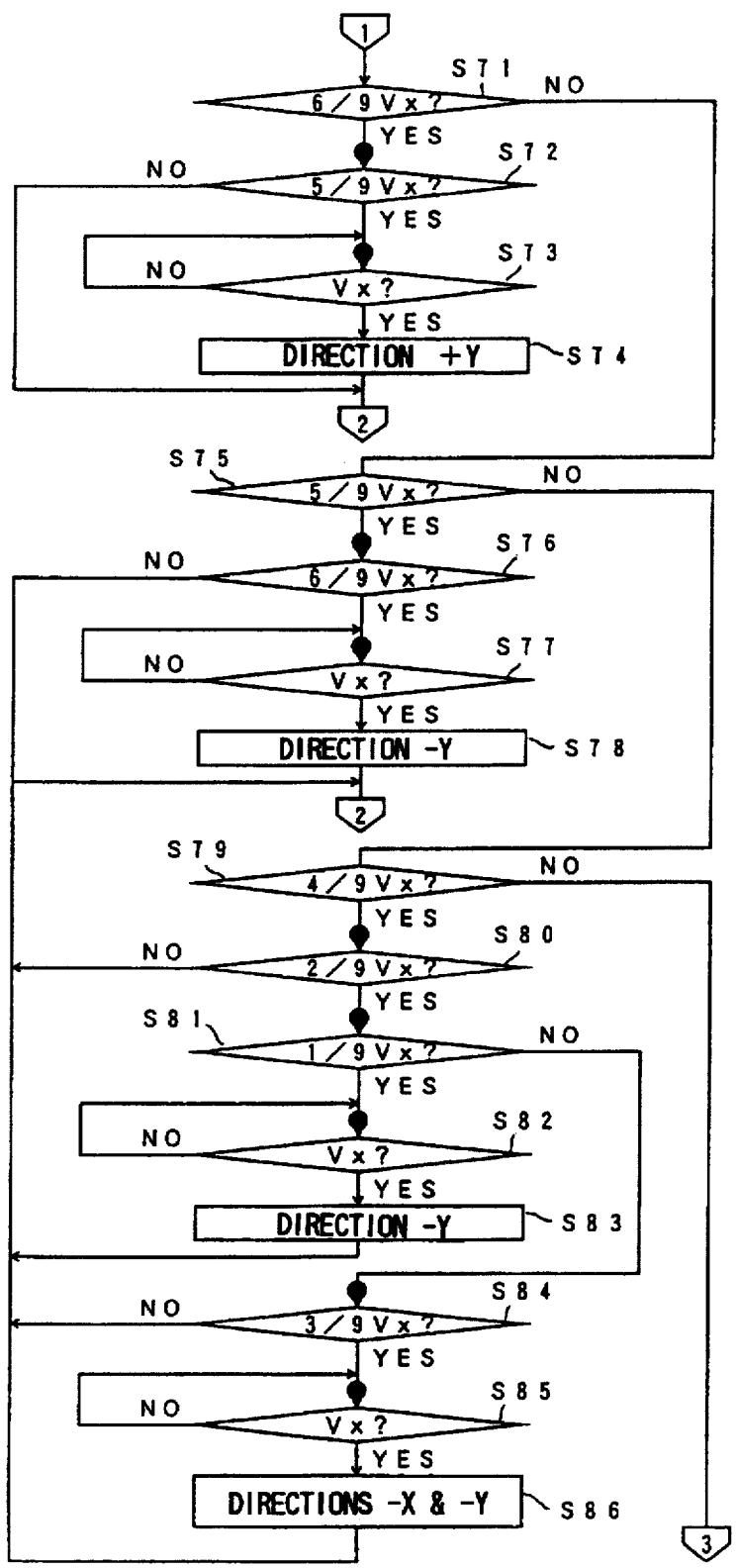
FIG. 69 is a flow chart for explaining the operation of the MPU in more detail.

A step S67 decides whether or not the voltage value of the output signal Vout is equal to (7/9)Vx, and the process advances to a step S71 shown in FIG. 69 which will be described later if the decision result in the step S67 is NO. If the decision result in the step S67 is YES, the output signal Vout is read, and a step S68 decides whether or not the voltage value of the output signal Vout is equal to (8/9)Vx. The process returns to the step S61 if the decision result in the step S68 is NO. On the other hand, if the decision result in the step S68 is YES, the output signal Vout is read, and a step S69 decides whether or not the voltage value of the output signal Vout is equal to Vx. If the decision result in the step S89 is YES, a step S70 generates and outputs the output signals XA and XB which indicate that the moving direction of the coordinate input part 102 is the direction -x, and the process returns to the step S61.

The step S71 shown in FIG. 69 decides whether or not the voltage value of the output signal Vout is equal to (6/9)Vx, and the process advances to a step S75 which will be described later if the decision result in the step S71 is NO. If the decision result in the step S71 is YES, the output signal Vout is read, and a step S72 decides whether or not the voltage value of the output signal Vout is equal to (5/9)Vx. If the decision result in the step S72 is NO, the process returns to the step S61 shown in FIG. 68. On the other hand, if the decision result in the step S72 is YES, the output signal Vout is read, and a step S73 decides whether or not the voltage value of the output signal Vout is equal to Vx. If the decision result in the step S73 is YES, a step S74 generates and outputs the output signals YA and YB which indicate that the moving direction of the coordinate input part 102 is the direction +y, and the process returns to the step S61 shown in FIG. 68.

A step S75 decides whether or not the voltage value of the output signal Vout is equal to (5/9)Vx, and the process advances to a step S79 which will be described later if the decision result in the step S75 is NO. If the decision result in the step S75 is YES, the output signal Vout is read, and a step S76 decides whether or not the voltage value of the output signal Vout is equal to (8/9)Vx. The process returns to the step S81 shown in FIG. 88 if the decision result in the step S78 is NO. On the other hand, if the decision result in the step S78 is YES, the output signal Vout is read, and a step S77 decides whether or not the voltage value of the output signal Vout is equal to Vx. If the decision result in the step S77 is YES, a step S78 generates and outputs the output signals YA and YB which indicate that the moving direction of the coordinate input part 102 is the direction -y, and the process returns to the step S81 shown in FIG. 68.

A step S79 decides whether or not the voltage value of the output signal Vout is equal to (4/9)Vx, and the process advances to a step S91 shown in FIG. 70 which will be described later if the decision result in the step S79 is NO. If the decision result in the step S79 is YES, the output signal Vout is read, and a step S80 decides whether or not the voltage value of the output signal Vout is equal to (2/9)Vx. If the decision result in the step S80 is NO, the process returns to the step S81 shown in FIG. 68. On the other hand, if the decision result in the step S80 is YES, the output signal Vout is read, and a step S81 decides whether or not the voltage value of the output signal Vout is equal to (1/9)Vx. If the decision result in the step S81 is NO, the output signal Vout is read, and the process advances to a step S84 which will be described later. In addition, if the decision result in the step S81 is YES, the output signal Vout is read, and a step S82 decides whether or not the voltage value of the output signal Vout is equal to Vx. If the decision result in the step S82 is YES, a step S83 generates and outputs the output signals YA and YB which indicate that the moving direction of the coordinate input part 102 is the direction -y, and the process returns to the step S61 shown in FIG. 68.

A step S84 decides whether or not the voltage value of the output signal Vout is equal to (3/9)Vx. The process returns to the step S61 shown in FIG. 68 if the decision result in the step S84 is NO. In addition, if the decision result in the step S84 is YES, the output signal Vout is read, and a step S85 decides whether or not the voltage value of the output signal Vout is equal to Vx. If the decision result in the step S85 is YES, a step S86 generates and outputs the output signals XA, XB, YA and YB which indicate that the moving direction of the coordinate input part 102 is both in the directions -x and -y, and the process returns to the step S61 shown in FIG. 68.

Figure 70:
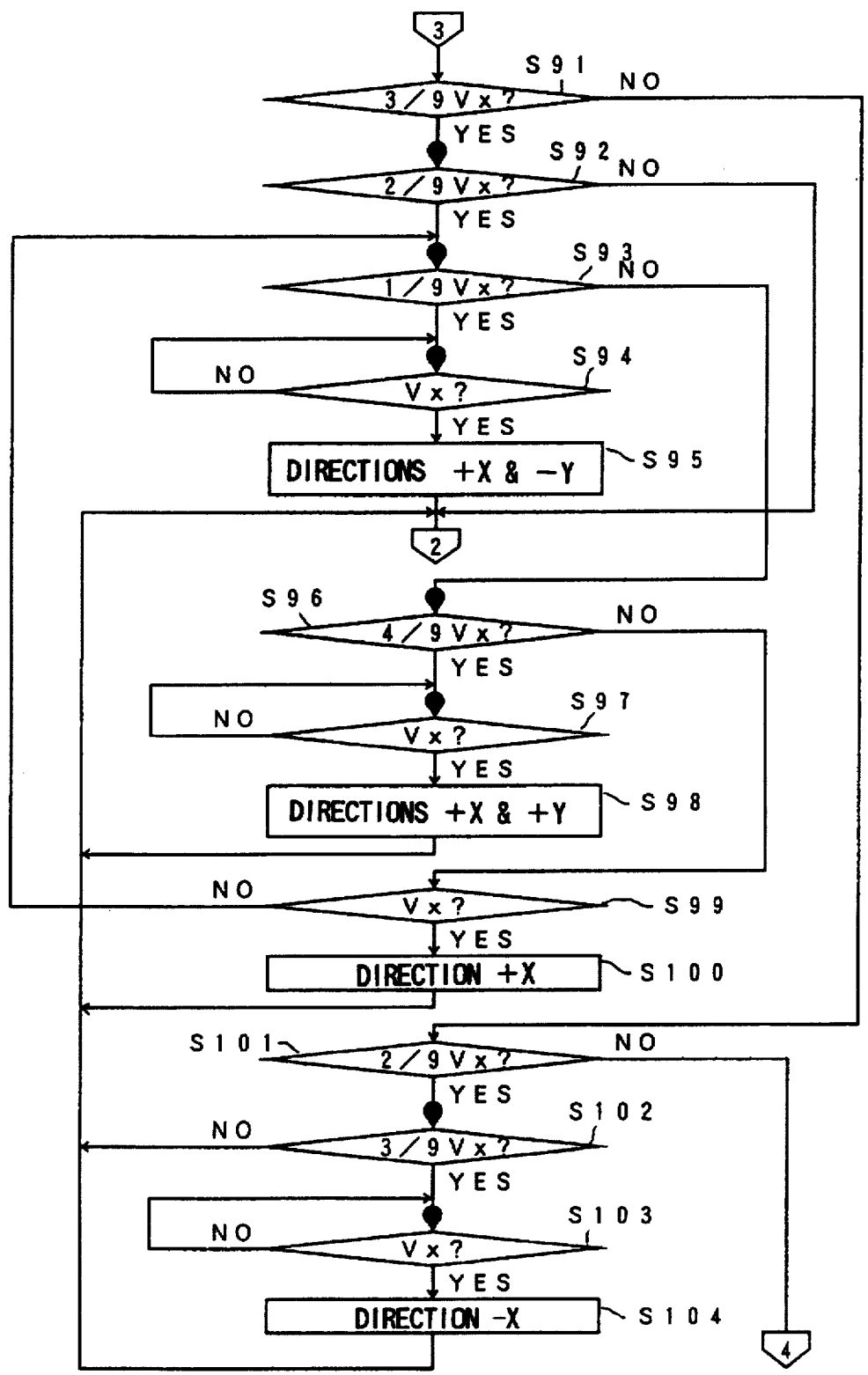
FIG. 70 is a flow chart for explaining the operation of the MPU in more detail.

In FIG. 70, a step S91 decides whether or not the voltage value of the output signal Vout is equal to (3/9)Vx, and the process advances to a step S101 which will be described later if the decision result in the step S91 is NO. If the decision result in the step S91 is YES, the output signal Vout is read, and a step S92 decides whether or not the voltage value of the output signal Vout is equal to (2/9)Vx. The process returns to the step S61 shown in FIG. 68 if the decision result in the step S92 is NO. On the other hand, if the decision result in the step S92 is YES, the output signal Vout is read, and a step S93 decides whether or not the voltage value of the output signal Vout is equal to (1/9)Vx. If the decision result in the step S93 is NO, the output signal Vout is read, and the process advances to a step S96 which will be described later. In addition, if the decision result in the step S93 is YES, the output signal Vout is read, and a step S94 decides whether or not the voltage value of the output signal Vout is equal to Vx. If the decision result in the step S94 is YES, a step S95 generates and outputs the output signals XA, XB, YA and YB which indicate that the moving direction of the coordinate input part 102 is both in the directions +x and -y, and the process returns to the step S61 shown in FIG. 68.

A step S96 decides whether or not the voltage value of the output signal Vout is equal to (4/9)Vx. If the decision result in the step S96 is NO, the process advances to a step S99 which will be described later. In addition, if the decision result in the step S96 is YES, the output signal Vout is read, and a step S97 decides whether or not the voltage value of the output signal Vout is equal to Vx. If the decision result in the step S97 is YES, a step S98 generates and outputs the output signals XA, XB, YA and YB which indicate that the moving direction of the coordinate input part 102 is both in the directions +x and +y, and the process returns to the step S61 shown in FIG. 68.

A step S99 decides whether or not the voltage value of the output signal Vout is equal to Vx. The process returns to the step S93 if the decision result in the step S99 is NO. On the other hand, if the decision result in the step S99 is YES, a step S100 generates and outputs the output signals XA and XB which indicate that the moving direction of the coordinate input part 102 is the direction +x, and the process returns to the step S61 shown in FIG. 68.

A step S101 decides whether or not the voltage value of the output signal Vout is equal to (2/9)Vx, and the process advances to a step S111 shown in FIG. 71 which will be described later if the decision result in the step S101 is NO. If the decision result in the step S101 is YES, the output signal Vout is read, and a step S102 decides whether or not the voltage value of the output signal Vout is equal to (3/9)Vx. The process returns to the step S61 shown in FIG. 68 if the decision result in the step S102 is NO. On the other hand, if the decision result in the step S102 is YES, the output signal Vout is read, and a step S103 decides whether or not the voltage value of the output signal Vout is equal to Vx. If the decision result in the step S103 is YES, a step S104 generates and outputs the output signals XA and XB which indicate that the moving direction of the coordinate input part 102 is the direction -x, and the process returns to the step S61 shown in FIG. 68.

Figure 71:
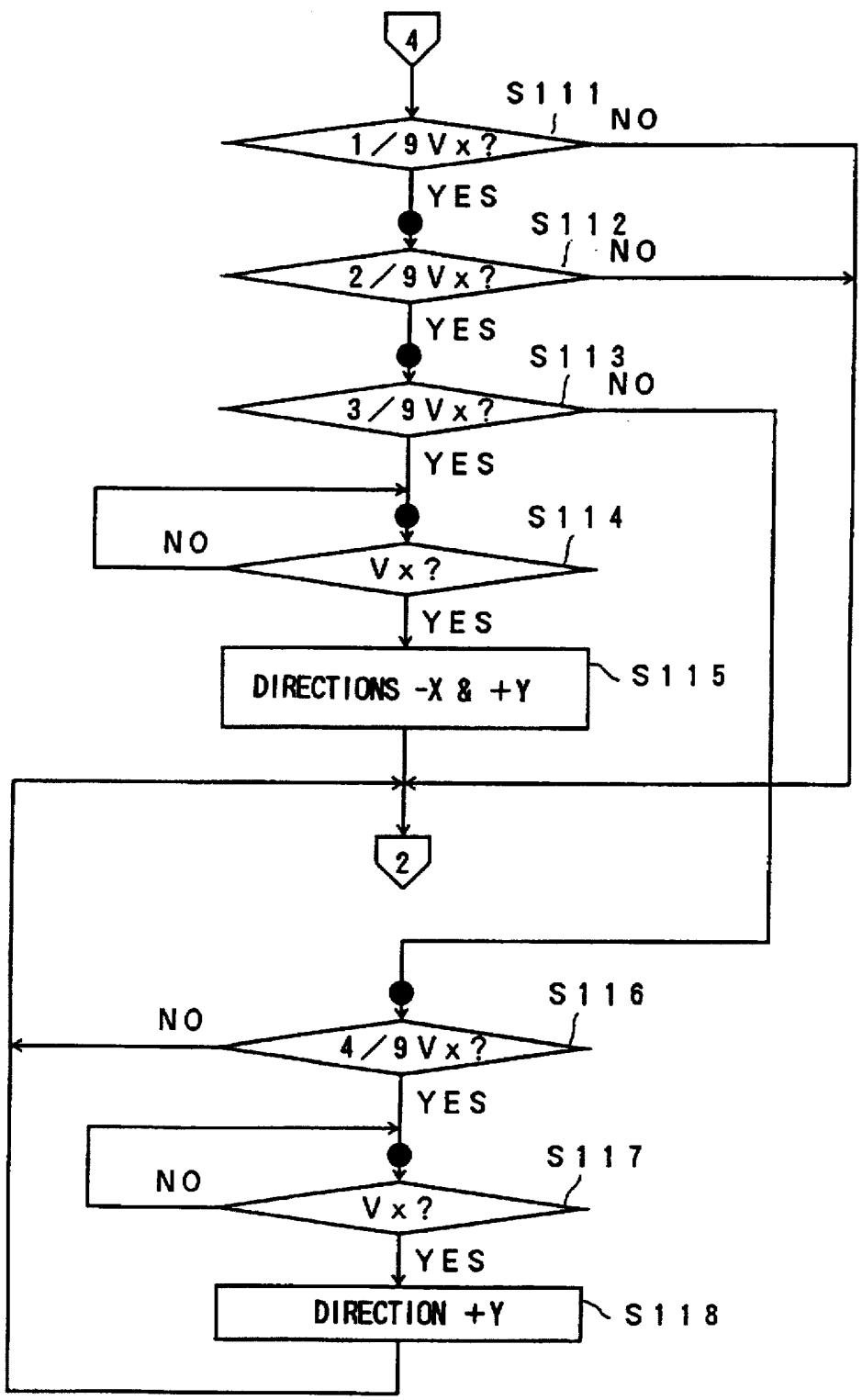
FIG. 71 is a flow chart for explaining the operation of the MPU in more detail.

In FIG. 71, a step S111 decides whether or not the voltage value of the output signal Vout is equal to (1/9)Vx, and the process returns to the step S61 shown in FIG. 68 if the decision result in the step S111 is NO. If the decision result in the step S111 is YES, the output signal Vout is read, and a step S112 decides whether or not the voltage value of the output signal Vout is equal to (2/9)Vx. If the decision result in the step S112 is NO, the process returns to the step S61 shown in FIG. 68. On the other hand, if the decision result in the step S112 is YES, the output signal Vout is read, and a step S113 decides whether or not the voltage value of the output signal Vout is equal to (3/9)Vx. If the decision result in the step S113 is NO, the output signal Vout is read, and the process advances to a step S116 which will be described later. On the other hand, if the decision result in the step S113 is YES, the output signal Vout is read, and a step S114 decides whether or not the voltage value of the output signal Vout is equal to Vx. If the decision result in the step S114 is YES, a step S115 generates and outputs the output signals XA, XB, YA and YB which indicate that the moving direction of the coordinate input part 102 is both in the directions -x and +y, and the process returns to the step S61 shown in FIG. 68.

A step S116 decides whether or not the voltage value of the output signal Vout is equal to (4/9)Vx. The process returns to the step S61 shown in FIG. 68 if the decision result in the step S116 is NO. In addition, if the decision result in the step S116 is YES, the output signal Vout is read, and a step S117 decides whether or not the voltage value of the output signal Vout is equal to Vx. If the decision result in the step S117 is YES, a step S118 generates and outputs the output signals YA and YB which indicate that the moving direction of the coordinate input part 102 is the direction +y, and the process returns to the step S61 shown in FIG. 68.

Next, a description will be given of a fifth embodiment of the pointing device according to the present invention, by referring to FIGS. 72 and 73.

Figure 72:
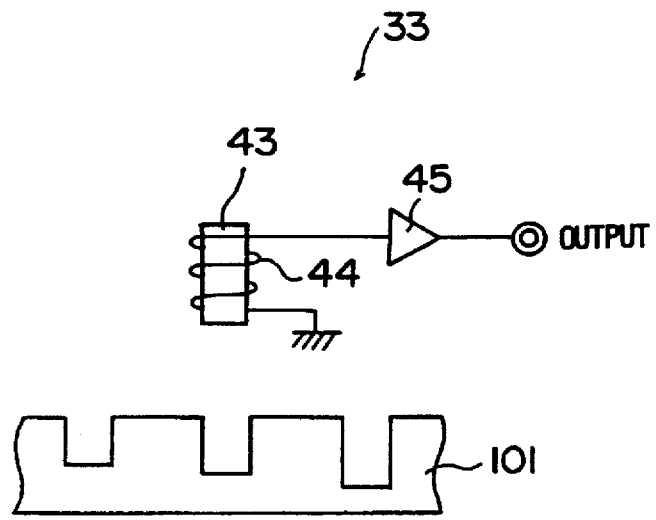
FIG. 72 is a diagram showing a part of a fifth embodiment of the pointing device according to the presentthe present invention.
Figure 73:
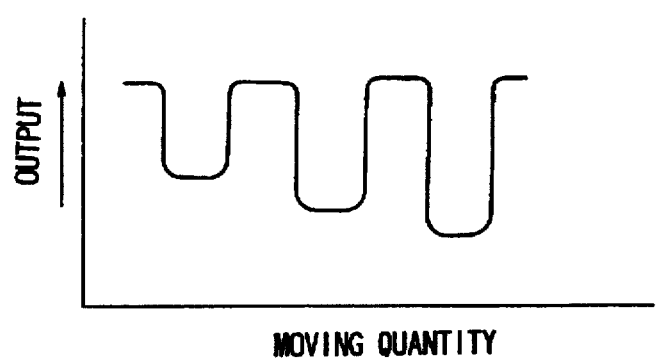
FIG. 73 is a diagram showing the relationship between the moving quantity of the coordinate input part and the output of the detector.

FIG. 72 shows a part of the fifth embodiment with a plate shown in cross section. In FIG. 72, the metal detection plate 101 is made of a magnetic material such as FeCoNi, similarly to the plate 1 of the first embodiment. A plurality of parallel grooves, respectively parallel to the x-axis and the y-axis, are provided on the surface of the plate 101 in the form of a checker board, similarly to the plate 101 shown in FIG. 47. On the other hand, the coordinate input part 102 has a single detector 33 which generally includes a permanent magnet 43, a coil 44 wound around the permanent magnet 43, and an amplifier 45. One end of the coil 44 is grounded, while the other end of the coil 44 is connected to the amplifier 45.

When one end of the coil 44 is moved on the plate 101, the magnetic field from the permanent magnet 43 reaches the coil 44 via the plate 101, thereby generating an electromotive force. This electromotive force is output via the amplifier 45. Since the plate 101 iS provided with the plurality of grooves, one end of the coil 44 alternately passes over the groove portion and the non-groove portion of the plate 101 as the coordinate input part 102 moves on the plate 101. Accordingly, the output signal of the amplifier 45 changes as shown in FIG. 73 depending on the moving quantity of the coordinate input part 102. This embodiment employs a kind of electromotive force system which detects the moving direction and the moving quantity of the coordinate input part 102 with respect to the plate 101 using the output change of the amplifier 45.

The construction of the plate 101, the construction of the casing of the coordinate input part 102, and the method of detecting the moving direction and the moving quantity of the coordinate input part 102 based on the output of the detector 33 can respectively be similar to those of the fourth embodiment described above, and illustration and description thereof will be omitted.

Next, a description will be given of a sixth embodiment of the pointing device according to the present invention, by referring to FIGS. 74 and 75.

Figure 74:
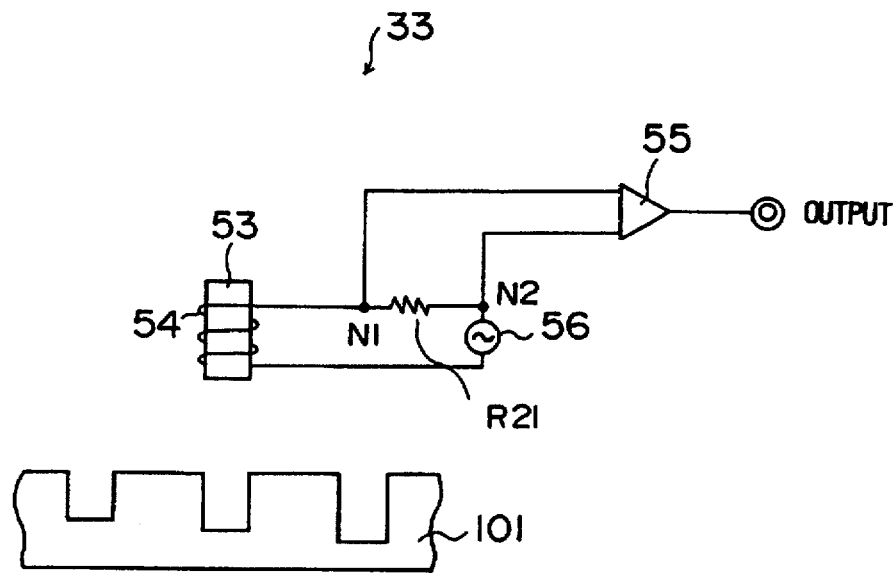
FIG. 74 is a diagram showing a part of a sixth embodiment of the pointing device according to the present invention.
Figure 75:
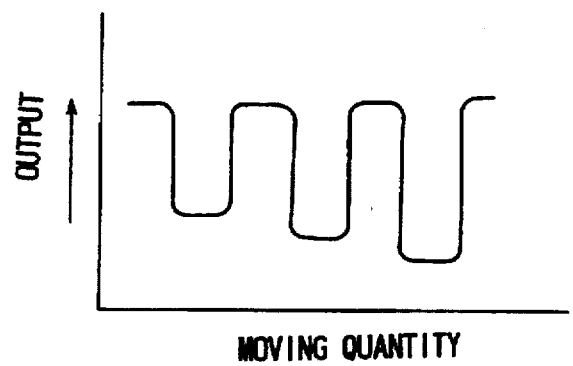
FIG. 75 is a diagram showing the relationship between the moving quantity of the coordinate input part and the output of the detector.

FIG. 74 shows a part of the sixth embodiment with a plate shown in cross section. In FIG. 74, the metal detection plate 101 is made of a magnetic material such as FeCoNi, similarly to the plate 1 of the first embodiment. A plurality of parallel grooves, respectively parallel to the x-axis and the y-axis, are provided on the surface of the plate 101 in the form of a checker board, similarly to the plate 101 shown in FIG. 47. On the other hand, the coordinate input part 102 has a single detector 33 which generally includes an iron core 53, a coil 54 wound around the iron core 53, an amplifier 55, a detection resistor R21, and an A.C. power supply 56. One end of the coil 54 is connected to one end of the A.C. power supply 56, and the other end of the coil 54 is connected to one input of the amplifier 55 and to one end of the resistor R21 via a node N1. The node N1 is connected to a node N2 via the resistor R21. This node N2 connects the other input of the amplifier 55 and the other end of the A.C. power supply 56.

When the A.C. voltage from the A.C. power supply 56 is applied to the coil 54 via the resistor R21 and the coil 54 is moved on the plate 101, the magnetic field from a magnet which is formed by the iron core 53 and the coil 54 r··· the coil 54 via the plate 101. As a result, the in·· component of the coil 54 changes, and the termin·· of the resistor R21 changes. The terminal volt resistor R21 is output via the amplifier 55. Sinc· of parallel grooves, respectively parallel to the x-a·· y-axis, are provided on the plate 101, one end of tr·· alternately passes over the groove portion and tr·· groove portion of the plate 101 as the coordinate inpu· 102 moves on the plate 101. Accordingly, the output signal of the amplifier 55 changes as shown in FIG. 75 depending on the moving quantity of the coordinate input part 102. This embodiment employs a kind of electromagnetic induction system which detects the moving direction and the moving quantity of the coordinate input part 102 with respect to the plate 101 using the output change of the amplifier 55.

The construction of the plate 101, the construction of the casing of the coordinate input part 102, and the method of detecting the moving direction and the moving quantity of the coordinate input part 102 based on the output of the detector 33 can respectively be similar to those of the fourth embodiment described above, and illustration and description thereof will be omitted.

In the fourth through sixth embodiments described above, the shapes and depths of the grooves 111 and 112 and the intersections 113 of the plate 101 are of course not limited to those shown. In addition, one groove may have therein two or more kinds of depths.

In the fourth through sixth embodiments described above, the moving direction and the moving quantity of the coordinate input part are detected by detecting the change in the magnetic flux or the magnetic field, and there is no need to make a detection using a mechanical part such as a ball. For this reason, the deterioration in the detection accuracy caused by the frictional wear of the mechanical parts will not occur in these embodiments. In these embodiments, it is possible to maintain the high detection accuracy without having to make the periodic maintenance that was otherwise necessary in the conventional case to remove the dust particles and the like. In addition, since these embodiments do not use a photocoupler, it is possible to avoid the deterioration in the detection accuracy that was conventionally caused by the deterioration of the photocoupler itself with time (age). Therefore, the fourth through sixth embodiments virtually do not require maintenance, and it is possible to always input the coordinates with a high and stable accuracy regardless of the age of the pointing device.

In addition, the fourth through sixth embodiments can detect the moving direction and the moving quantity of the coordinate input part with respect to the plate using a single detector. For this reason, the construction of the coordinate input part itself is very simple compared to the first through third embodiments.

Moreover, in each of the embodiments described above, the plate may be provided with projecting stripes or rails, for example, instead of the grooves. In other words, the plate simply needs to have at least one surface with a regular change in geometrical configuration or shape along two mutually perpendicular directions that would make it possible to detect the change in the magnetic flux or the magnetic field fed which is back to one or more detectors of the coordinate input part via the plate when the coordinate input part is moved on the plate.

Further, the present invention is not limited to these embodiments, but various variations and modifications may be made without departing from the scope of the present invention.

··med is:
  ·evice comprising:
  ·ae ·· a magnetic material and having at least
    ·ce ···th a regular change in first geometrical
    ·atic · ·long a direction y, and a regular change
    ·d ·· ·metrical configuration along a direction x
      ·endicular to the direction y, said change in
      ·etrical configuration being different from the
      ·· second geometrical configuration; and
  ·····aate input part slidably provided on the surface of
    said plate,
  said coordinate input part comprising:
    a mechanism which generates magnetic flux; and
    a mechanism which detects a change in the magnetic flux fed back to said coordinate input part via said plate and generates signals indicating a moving direction and a moving quantity of said coordinate input part on said plate.

2. A pointing device comprising:
   a plate made of a magnetic material and having at least one surface with first grooves regularly provided along a direction y, and second grooves regularly provided along a direction x which is perpendicular to the direction y, said first grooves having depths different from said second grooves; and
   a coordinate input part slidably provided on the surface of said plate,
   said coordinate input part comprising:
     a first mechanism which generates magnetic flux; and
     a second mechanism which detects a change in the magnetic flux fed back to said coordinate input part via said plate and generates signals indicating a moving direction and a moving quantity of said coordinate input part on said plate.

3. The pointing device as claimed in claim 2, wherein each intersection of the first groove and the second groove on said plate has a depth which is a sum of the depth of the first groove and the depth of the second groove.

4. The pointing device as claimed in claim 2, wherein said plate includes a protection layer provided on the surface of said plate having the first and second grooves.

5. The pointing device as claimed in claim 2, wherein said first mechanism comprises:
   a first pair of detectors provided along the direction x with a pitch different from a pitch of the second grooves and outputting signals corresponding to the second grooves;
   a second pair of detectors provided along the direction y with a pitch different from a pitch of the first grooves and outputting signals corresponding to the first grooves; and said second mechanism comprises a processing part generating the signals indicating the moving direction and the moving quantity of said coordinate input part on said plate based on the signals output from said first and second pairs of detectors.

6. The pointing device as claimed in claim 5, wherein each detector forming said first and second pairs of detectors comprises:

a permanent magnet; and a Hall element detecting a change in the magnetic flux generated from said permanent magnet and fed back to said permanent magnet via said plate.

7. The pointing device as claimed in claim 5, wherein each detector forming said first and second pairs of detectors comprises:

a permanent magnet; and a coil having first and second ends and wound around said permanent magnet, the first end of said coil being grounded, the second end of said coil generating a signal including a change in electromotive force caused by the magnetic flux generated from said permanent magnet and fed back to said permanent magnet via said plate.

8. The pointing device as claimed in claim 5, wherein each detector forming said first and second pairs of detectors comprises:

an iron core;

a coil wound around said iron core;

an A.C. power supply applying an A.C. voltage to said coil; and a mechanism which detects a change in an inductance component of said coil caused by the magnetic flux which is generated by said iron core and said coil applied with the A.C. voltage and is fed back thereto via said plate.

9. A pointing device comprising:

a plate, made of a magnetic material, having at least one surface with first grooves regularly provided along a direction y and having depths increasing towards a direction +y or −y, and second grooves regularly provided along a direction x which is perpendicular to the direction y and having depths increasing towards a direction +x or −x, said first grooves having depths different from said second grooves, where the directions +y and −y respectively indicate positive and negative directions along the direction y and the directions +x and −x respectively indicate positive and negative directions along the direction x; and a coordinate input part slidably provided on the surface of said plate, said coordinate input part comprising:

a first mechanism which generates magnetic flux; and a second mechanism which detects a change in the magnetic flux fed back to said coordinate input part via said plate and generates signals indicating a moving direction and a moving quantity of said coordinate input part on said plate.

10. The pointing device as claimed in claim 9, wherein each intersection of the first groove and the second groove on said plate has a depth which is a sum of the depth of the first groove and the depth of the second groove.

11. The pointing device as claimed in claim 9, wherein said plate includes a protection layer provided on the surface of said plate having the first and second grooves.

12. The pointing device as claimed in claim 9, wherein said first mechanism comprises:

a detector outputting signals corresponding to the first and second grooves; and said second mechanism comprises processing part generating the signals indicating the moving direction and the moving quantity of said coordinate input part on said plate based changes in the signals output from said detector.

13. The pointing device as claimed in claim 12, wherein said detector comprises:

a permanent magnet; and a Hall element detecting a change in the magnetic flux generated from said permanent magnet and fed back to said permanent magnet via said plate.

14. The pointing device as claimed in claim 12, wherein said detector comprises:

a permanent magnet; and a coil having first and second ends and wound around said permanent magnet, the first end of said coil being grounded, the second end of said coil generating a signal including a change in electromotive force caused by the magnetic flux generated from said permanent magnet and fed back to said permanent magnet via said plate.

15. The pointing device as claimed in claim 12, wherein said detector comprises:

an iron core;

a coil wound around said iron core;

an A.C. power supply applying an A.C. voltage to said coil; and a mechanism which detects a change in an inductance component of said coil caused by the magnetic flux which is generated by said iron core and said coil applied with the A.C. voltage and is fed back thereto via said plate.

* * * * *